United States Patent
Ikeda et al.

(10) Patent No.: US 8,724,170 B2
(45) Date of Patent: May 13, 2014

(54) IMAGE FORMING APPARATUS AND IMAGE QUALITY ADJUSTMENT METHOD

(75) Inventors: Takemasa Ikeda, Hachioji (JP); Masanori Yoshizawa, Hino (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 176 days.

(21) Appl. No.: 13/365,534

(22) Filed: Feb. 3, 2012

(65) Prior Publication Data
US 2012/0200868 A1     Aug. 9, 2012

(30) Foreign Application Priority Data

Feb. 9, 2011 (JP) ................................. 2011-025538

(51) Int. Cl.
    *G06K 15/02*       (2006.01)
    *H04N 1/405*       (2006.01)

(52) U.S. Cl.
    CPC .................................. *H04N 1/4052* (2013.01)
    USPC ......................................... 358/1.9; 358/3.03

(58) Field of Classification Search
    USPC ........... 358/468, 1.9, 2.1, 515, 519, 520, 530, 358/534, 3.03
See application file for complete search history.

(56) References Cited

U.S. PATENT DOCUMENTS

| 5,854,958 | A | * | 12/1998 | Tanimoto et al. | 399/49 |
|---|---|---|---|---|---|
| 6,900,880 | B2 | * | 5/2005 | Kida et al. | 355/67 |
| 7,415,231 | B2 | * | 8/2008 | Maeda | 399/301 |
| 8,186,799 | B2 | * | 5/2012 | Morino et al. | 347/19 |
| 2008/0180706 | A1 | * | 7/2008 | Yanagi | 358/1.9 |
| 2008/0231649 | A1 | * | 9/2008 | Kawabata et al. | 347/14 |
| 2011/0026063 | A1 | * | 2/2011 | Nakai et al. | 358/1.14 |
| 2011/0242609 | A1 | * | 10/2011 | Oki | 358/3.03 |
| 2012/0140060 | A1 | * | 6/2012 | Tsuchiya et al. | 348/126 |
| 2012/0201552 | A1 | * | 8/2012 | Hirai et al. | 399/49 |

FOREIGN PATENT DOCUMENTS

| JP | 2009-042691 A | 2/2009 |
|---|---|---|
| JP | 2010-182083 A | 8/2010 |

* cited by examiner

*Primary Examiner* — Jerome Grant, II
(74) *Attorney, Agent, or Firm* — Holtz, Holtz, Goodman & Chick, PC

(57) ABSTRACT

Disclosed is an image forming apparatus including: an image forming section which forms an image on paper; a plurality of image reading sections each of which reads the image formed on the paper, and is connectable to the image forming apparatus; a storage section which stores connection information on a connection state between each of the image reading sections and the image forming apparatus; and a control section which selects a test image reading section from among the image reading sections based on the connection information, makes the selected test image reading section read a test image formed by the image forming section, and performs image quality adjustment based on the read test image.

7 Claims, 19 Drawing Sheets

FIG.4

| UNIT NAME | ADJUSTMENT ITEM |
|---|---|
| INTERMEDIATE TRANSFER UNIT | BLADE SET MODE (FOR INTERMEDIATE TRANSFER) |
| | BELT LINEAR VELOCITY ADJUSTMENT |
| | COLOR RESIST ADJUSTMENT |
| | GAMMA ADJUSTMENT |
| SECONDARY TRANSFER UNIT | BLADE SET MODE (FOR SECONDARY TRANSFER) |
| | BELT LINEAR VELOCITY ADJUSTMENT |
| | COLOR RESIST ADJUSTMENT |
| | GAMMA ADJUSTMENT |
| FIXING UNIT | N/A |
| DEVELOPING UNIT (Y) | DEVELOPER INJECTION |
| DEVELOPER UNIT (Y) | TONER DENSITY SENSOR INITIAL ADJUSTMENT (Y) |
| | GAMMA ADJUSTMENT |
| | PRINTER GAMMA OFFSET ADJUSTMENT |
| DEVELOPING UNIT (M) | DEVELOPER INJECTION |
| DEVELOPER UNIT (M) | TONER DENSITY SENSOR INITIAL ADJUSTMENT (M) |
| | GAMMA ADJUSTMENT |
| | PRINTER GAMMA OFFSET ADJUSTMENT |
| ⋮ | ⋮ |

FIG.8

| ‹ UNIT NAME › | ‹ LIFE CYCLE ›<br>0%:NEW 100%:END | DATE OF<br>REPLACEMENT | REASON FOR<br>REPLACEMENT |
|---|---|---|---|
| ☑ DEVELOPING UNIT (Black) | 99.9% | 32/50/00 | SCHEDULED REPLACEMENT |
| ☐ DRUM UNIT (Magenta) | 99.9% | 02/01/04 | |
| ☐ DRUM UNIT (Black) | 99.9% | | |
| ☐ DRUM UNIT (Yellow) | 64.7% | | |
| ☐ DEVELOPING UNIT (Magenta) | 55.9% | 32/49/98 | |
| ☐ DEVELOPER UNIT (Black) | 42.0% | | |
| ☐ CHARGED ELECTRODE (Black) | 32.0% | 32/50/00 | |
| ☐ FIXING UNIT | 5.6% | 11/05/10 | |
| ☐ DEVELOPER UNIT (Yellow) | 2.5% | | |
| ☐ INTERMEDIATE TRANSFER UNIT | 2.1% | | |
| ☐ DRUM UNIT (Cyan) | 0.3% | 34/48/26 | |
| ☐ CHARGED ELECTRODE (Magenta) | 0.1% | 32/49/98 | |

FIG.14

IMAGE FORMING APPARATUS AND IMAGE QUALITY ADJUSTMENT METHOD

BACKGROUND OF THE INVENTION

1. Field of the Invention

The present invention relates to an image forming apparatus and an image quality adjustment method.

2. Description of the Related Art

Conventionally, a maintenance personnel (also referred to as a customer engineer or a service person) replaces replaceable components among a plurality of components of an image forming apparatus which forms images with the plurality of components. However, there is a case, with respect to the components which can be relatively easily and safely replaced, a user who uses the image forming apparatus performs a component replacement operation. Such a mechanism which allows a user to perform the component replacement operation (ORU-M: Operator Replaceable Unit-Management) has been common to be adopted. By adopting ORU-M, a user can replace some components of an image forming apparatus, and hence downtime and repair costs of the image forming apparatus can be reduced.

For example, Japanese Patent Application Laid-Open Publication No. 2009-42691 discloses a technology by which a toner image for image quality determination is formed, a unit to be replaced is specified based on the result of pattern analysis of the toner image, and information to replace the unit or to unlock the unit is notified, when a user recognizes abnormality in an output image or an image forming apparatus, or feels necessity of maintenance of the image forming apparatus, and presses an abnormality notification button.

Furthermore, Japanese Patent Application Laid-Open Publication No. 2010-182083 discloses a technology by which a maintenance-target unit to be replaced or repaired is specified by referring to an error code, related units which need to be removed to replace or repair the maintenance-target unit are specified and displayed, and information on a replacement operation or a repair operation is notified in accordance with the maintenance contents for the maintenance-target unit indicating replacement or repair.

When unit replacement is performed by adopting ORU-M, various adjustments need to be made so that the replaced unit fits the current state of the image forming apparatus.

However, there are some adjustment items for replaced components, the adjustment items each of which has a plurality of sections/methods to make the adjustment. In such a case, it is necessary for a user to select one of the sections/methods to use. For example, when the adjustment item is image quality adjustment based on a read test image, and there is a plurality of reading sections/methods to read the test image, it is difficult and complicated for a user who does not have technical knowledge to judge which reading section/method is most suitable to use.

SUMMARY OF THE INVENTION

In view of the above-described circumstances, objects of the present invention are to reduce user's workload to perform adjustment processing, and to increase user's work efficiency.

In order to achieve at least one object described above, according to an aspect of the present invention, there is provided an image forming apparatus including: an image forming section which forms an image on paper; a plurality of image reading sections each of which reads the image formed on the paper, and is connectable to the image forming apparatus; a storage section which stores connection information on a connection state between each of the image reading sections and the image forming apparatus; and a control section which selects a test image reading section from among the image reading sections based on the connection information, makes the selected test image reading section read a test image formed by the image forming section, and performs image quality adjustment based on the read test image.

Preferably, the image forming apparatus further includes: a paper feeding section including a plurality of paper feeding trays which house paper size by size to feed the paper so that the test image is formed on the paper by the image forming section, wherein the storage section stores housed paper size information on a size of the paper housed in each of the feeding paper trays, and readable paper size information on a size of paper readable by each of the image reading sections, and the control section selects the test image reading section from among the image reading sections based on the housed paper size information and the readable paper size information.

Preferably, the image forming apparatus further includes: a selection instruction section which receives a selection instruction to select the test image reading section from among the image reading sections so that the image quality adjustment is performed, wherein the storage section stores selection history information on a number of the selection instruction received by the selection instruction section with respect to each of the image reading sections; and the control section selects the test image reading section from among the image reading sections based on the selection history information.

Preferably, in the image forming apparatus, the image reading sections include a first image reading section which reads the image formed on the paper, and a second image reading section which is disposed on a paper carry path and reads the image formed on the paper in being carried, and the control section selects the first image reading section as the test image reading section when the first image reading section and the second image reading section are in a connected state.

Preferably, the image forming apparatus further includes: an input section which receives information on the image quality adjustment based the test image formed by the image forming section, and the control section performs the image quality adjustment based on the information on the image quality adjustment received by the input section when the first image reading section and the second image reading section are not in the connected state.

Preferably, in the image forming apparatus, the storage section stores adjustment item information on an adjustment item for a component of the image forming apparatus, the adjustment item which is necessary to be performed when the component is replaced, and when the image quality adjustment is included in the adjustment item information for the replaced component, the control section selects the test image reading section from among the image reading sections based on the connection information, makes the selected test image reading section read the test image formed by the image forming section, and performs the image quality adjustment based on the read test image.

BRIEF DESCRIPTION OF THE SEVERAL VIEWS OF THE DRAWING

The present invention will be fully understood by the following detailed description and the accompanying drawings, which are not intended to limit the present invention, wherein:

FIG. 4 shows an example of adjustment item information;

FIG. 8 is an example of a replaceable unit setting screen;

FIG. 14 shows an example of a printing mode screen;

DETAILED DESCRIPTION OF THE INVENTION

In the following, an embodiment of the present invention is described with reference to the accompanying drawings.

First, the configuration of an image forming apparatus according to the embodiment is described.

Figure 1:
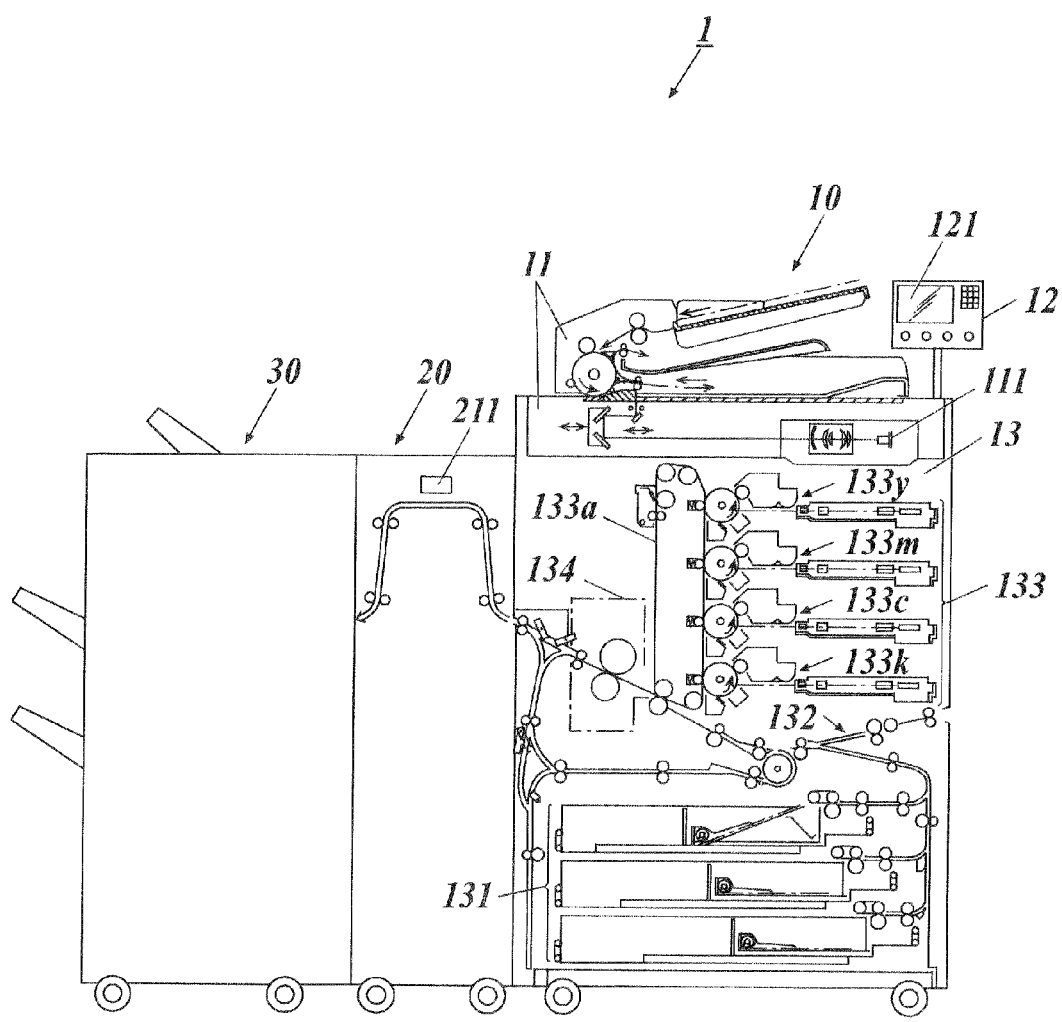
FIG. 1 is a sectional view schematically showing the configuration of an image forming apparatus according to an embodiment of the present invention.

FIG. 1 is a sectional view schematically showing the configuration of an image forming apparatus 1 according to the embodiment.

As shown in FIG. 1, the image forming apparatus 1 includes an image forming main body apparatus 10, a relay unit (RU) 20, and a finishing apparatus 30 connected with each other and disposed in the order named from the upstream side of a paper carry path (i.e. in a paper carry direction).

The image forming main body apparatus 10 reads an image from a document, and forms the read image on paper. Also, the image forming main body apparatus 10 receives, from an expanding apparatus or the like, print data in a PDL (Page Description Language) format, in a Tiff (Tagged Image File) format or the like, and also receives print setting data in which various output instructions are set for the print data, and forms an image on paper based on the received print data and print setting data, and the like. The image forming main body apparatus 10 includes a scan section 11, an operation display section 12, and a printing section 13.

The scan section 11 includes an auto document sending section called an ADF (Auto Document Feeder) and a reading section. The scan section 11 reads an image formed on paper based on setting information received by the operation display section 12, and generates image data of analog signals. Paper placed on a document tray of the auto document sending section is carried to a contact glass which is a reading point, and an image/images on one side or both sides of the paper is read by an optical system so as to be read by a CCD (Charge Coupled Device) 111. Note that images are not limited to image data, such as figures and pictures, but include text data, such as letters and symbols.

Hence, the scan section 11 realizes a function as a first image reading section which reads images formed on paper.

The operation display section 12 includes an LCD (Liquid Crystal Display) 121, a touch panel disposed to cover the LCD 121, various switches and buttons, a numeric keypad, and an operation key set. The operation display section 12 receives instructions from a user, and outputs operation signals corresponding to the instructions to a control section 150 (shown in FIG. 2). Furthermore, the operation display section 12 displays: various setting screens for inputting various operation instructions and setting information; various processing results; and the like, in accordance with display signals inputted from the control section 150.

The printing section 13 performs electrophotographic image forming processing. The printing section 13 includes a paper feeding section 131, a paper carrying section 132, an image forming section 133 for a plurality of colors, and a fixing unit 134, the sections and the unit which are related to printing-out.

The printing section 13 of the embodiment employs an electrophotographic system. However, this is not a limit, and hence another printing system such as an inkjet system or a heat-used dye sublimation system may be employed.

The paper feeding section 131 includes a plurality of paper feeding trays. Each of the paper feeding trays includes a paper feeding unit including a paper feeding roller, a separation roller, a paper feeding/separation rubber, and a sending-out roller. Sheets of paper classified in advance based on the kinds of the paper (paper type, weight, size, and the like) are housed in the paper feeding trays. The sheets housed in each of the paper feeding trays are fed to the paper carrying section 132 one by one from the top by the paper carrying unit.

The paper carrying section 132 carries paper, which is fed from the paper feeding section 131, onto the paper carry path toward the image forming section 133, the paper carry path on which a plurality of intermediate rollers, a resist roller, and the like are provided, so as to carry the paper to a secondary transfer position of the image forming section 133. The paper is once stopped on the upstream side of the resist roller and then carried to the downstream side of the resist roller, in accordance with writing timing of the image forming section 133.

The image forming section 133 includes, for each color, a photosensitive drum, a charging unit, an exposure unit, a developing unit, a primary transfer roller, and a cleaner, and generates output materials on which images are formed based on print image data. The image forming main body apparatus 10 of the embodiment is an apparatus which forms color images, and hence the image forming section 133 is provided for a plurality of colors. That is, the image forming section 133 includes image forming sections $133y$, $133m$, $133c$ and $133k$. However, this is not a limit, and hence the image forming main body apparatus 10 may be an apparatus which forms monochrome images.

In the image forming section $133y$ which forms yellow (Y) toner images, the surface of the photosensitive drum, the surface being charged by the charging unit, is exposed to light for print image data of yellow (Y) emitted from the exposure unit, so that an electrostatic latent image is written thereon. Then, with the developing unit, charged yellow toners adhere onto the surface of the photosensitive drum, the surface on which the electrostatic latent image is written, so that the electrostatic latent image is developed. By the photosensitive drum rotating at a certain speed, the toners adhering, with the developing unit, onto the photosensitive drum are transferred to an intermediate transfer belt 133a at a primary transfer position at which the primary transfer roller is disposed. After the toners are transferred to the intermediate transfer belt 133a, the residual charges, the residual toners, and the like on the surface of the photosensitive drum are removed by the cleaner. The removed toners and the like are collected into a toner collection box.

Similarly, each of the image forming sections 133m, 133c, and 133k includes the photosensitive drum, and also the charging unit, the exposure unit, the developing unit, the primary transfer roller, and the cleaner, which are disposed around the photosensitive drum. The image forming sections 133m, 133c, and 133k form magenta (M) toner images, cyan (C) toner images, and black (K) toner images, respectively.

Toner images of the colors transferred onto the intermediate transfer belt 133a are transferred onto paper in a lump at the secondary transfer position at which a secondary transfer roller is disposed.

The fixing unit 134 includes a fixing heater and a fixing roller, and fixes the toner images transferred onto the paper by heat (fixing processing).

The paper on which the fixing processing is performed is carried to the RU 20 by a paper ejection roller and the like.

The RU 20 includes an IDC (Image Density Control) sensor 211 and various carrying rollers.

The IDC sensor 211 is a reflective sensor, and includes an LED light source, a light receiving element, a lens, and a lens holder. The IDC sensor 211 is disposed on the paper carry path. The IDC sensor 211 reads an image formed and fixed on paper by colorimetry with respect to each of yellow (Y), magenta (M), cyan (C) and black (K), and generates colorimetric data in accordance with the density of each color obtained by colorimetry.

When the image forming main body apparatus 10 forms a test image on paper, the RU 20 reads the test image with the IDC sensor 211, and outputs the colorimetric data generated by reading the test image to the control section 150. Hence, the RU 20 provided with the IDC sensor 211 realizes a function as a second image reading section which is disposed on the paper carry path, and reads images formed on paper in being carried.

The RU 20 may have a function to synchronize a carry speed at which paper is carried from the image forming main body apparatus 10 to the RU 20 with a carry speed at which paper is carried from the RU 20 to the finishing apparatus 30.

The finishing apparatus 30 includes a paper ejection tray and a finishing section 311 having various finishing units such as a reversing unit, a sorting unit, a stapling unit, a punching unit, a folding unit, and a binding unit. The finishing apparatus 30 performs various types of finishing on paper carried thereto in accordance with instructions from the image forming main body apparatus 10, and ejects the paper on which the finishing is performed to the paper ejection tray.

Figure 2:
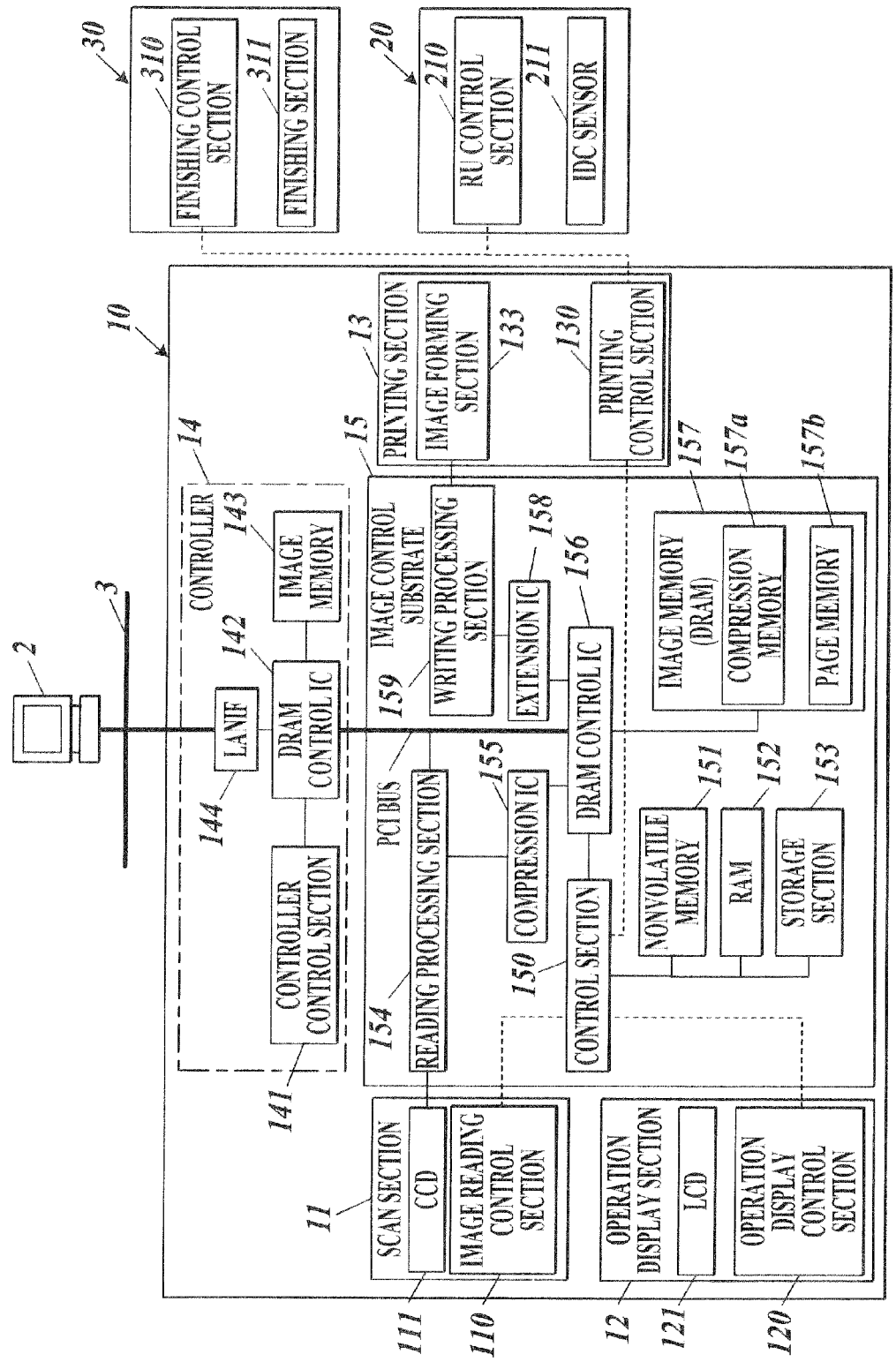
FIG. 2 is a control block diagram of the image forming apparatus.

FIG. 2 is a control block diagram of the image forming apparatus 1 according to the embodiment.

As shown in FIG. 2, the image forming apparatus 1 includes the image forming main body apparatus 10, the RU 20, and the finishing apparatus 30.

The image forming main body apparatus 10 includes the scan section 11, the operation display section 12, the printing section 13, a controller 14, and an image control substrate 15. The image forming main body apparatus 10 is connected with an external apparatus 2 on a network 3 via a LANIF (Local Area Network InterFace) 144 of the controller 14 so as to transfer/receive data to/from the external apparatus 2.

The scan section 11 includes an image reading control section 110 in addition to the above-described auto document sending section and reading section. The image reading control section 110 controls the auto document sending section, the reading section, and the like based on instructions from the control section 150 so as to realize a scan function to read images formed on paper as image data of analog signals. The image data of analog signals read by the scan section 11 are outputted to a reading processing section 154. The reading processing section 154 performs A/D conversion on the image data of analog signals, and performs various types of image processing on the converted image data.

The operation display section 12 includes an operation display control section 120 in addition to the above-described LCD 121, touch panel, and the like. The operation display control section 120 displays: the various screens for inputting various setting conditions; various processing results; and the like, on the LCD 121, in accordance with display signals inputted from the control section 150. The operation display control section 120 outputs operation signals inputted from the various switches and buttons, a start key, the numeric keypad, the operation key set, the touch panel, and the like, to the control section 150.

The printing section 13 includes a printing control section 130 in addition to the above-described paper feeding section 131, paper carrying section 132, image forming section 133, and fixing unit 134, the sections and the unit which are related to printing-out. The printing control section 130 controls operations of the sections and the like of the printing section 13, such as the image forming section 133, in accordance with instructions from the control section 150 to perform image formation based on the print image data inputted from a writing processing section 159.

The controller 14 manages and controls data inputted into the image forming apparatus 1 from the expanding apparatus 2 or the like connected to the network 3. The controller 14 receives data for printing (print data and print setting data), and transmits the print setting data and image data generated by expanding the print data to the image control substrate 15.

The controller 14 includes a controller control section 141, a DRAM (Dynamic Random Access Memory) control IC 142, an image memory 143, and a LANIF 144.

The controller control section 141 controls operations of the sections and the like of the controller 14 as a whole, and generates image data in a bitmap format by expanding the print data inputted from the expanding apparatus 2 via the LANIF 144.

The DRAM control IC 142 controls transfer of the print data received by the LANIF 144 to the controller control section 141 and writing/reading of the image data and the print setting data into/from the image memory 143. The DRAM control IC 142 is connected with a DRAM control IC 156 of the image control substrate 15 by a PCI (Peripheral Components Interconnect) bus, and reads the image data subjected to printing-out and the print setting data from the image memory 143, and outputs the data to the DRAM control IC 156, in accordance with instructions from the controller control section 141.

The image memory 143 is constituted of a volatile memory such as a DRAM, and temporarily stores the received print data and print setting data, the generated image data, and the like.

The LANIF 144 is a communication interface, such as an NIC (Network Interface Card) or a modem, for connecting to the network 3 such as a LAN, and receives the print data and the print setting data from the expanding apparatus 2. The received print data and print setting data are outputted to the DRAM control IC 142.

The image control substrate 15 includes the control section 150, a nonvolatile memory 151, a RAM (Random Access Memory) 152, a storage section 153, the reading processing section 154, a compression IC 155, the DRAM control IC 156, an extension IC 158, and the writing processing section 159.

The control section 150 is constituted of a CPU (Central Processing Unit) or the like. The control section 150 reads a system program and a specific program of various application programs from the nonvolatile memory 151, loads the programs to the RAM 152, and performs processing in cooperation with the programs loaded to the RAM 152, thereby performing centralized control of the sections and the like of the image forming main body apparatus 10.

Furthermore, the control section 150 performs adjustment item setting processing and image reading section selection processing based on an adjustment item setting processing program and an image reading section selection processing program of the embodiment, the programs which are read from the nonvolatile memory 151, data for the programs, and other various data.

The adjustment item setting processing is performed in an ORU-M mode.

The ORU-M mode is a mode in which a user replaces a unit (component) of the image forming apparatus 1.

In the adjustment item setting processing, adjustment items performed in the image forming apparatus 1 are set for the unit replaced in the ORU-M mode based on the adjustment item information stored in the storage section 153, and adjustment processing corresponding to each of the set adjustment items is performed.

When the adjustment items set in the adjustment item setting processing includes an item relative to image quality adjustment, the image reading section selection processing is performed.

In the image reading section selection processing, an image reading section is selected from among a plurality of image reading sections (in the embodiment, the scan section 11 and the RU 20) based on connection information indicating a connection state between each of the image reading sections and the image forming apparatus 1. The test image formed by the image forming section is read by the selected image reading section (test image reading section), and the image quality adjustment (in the embodiment, printer gamma offset adjustment) is performed based on the read test image.

In the printer gamma offset adjustment, an offset value for correcting the rise characteristic of the gamma curve for each color (Y, M, C and K) is set.

Figure 3:
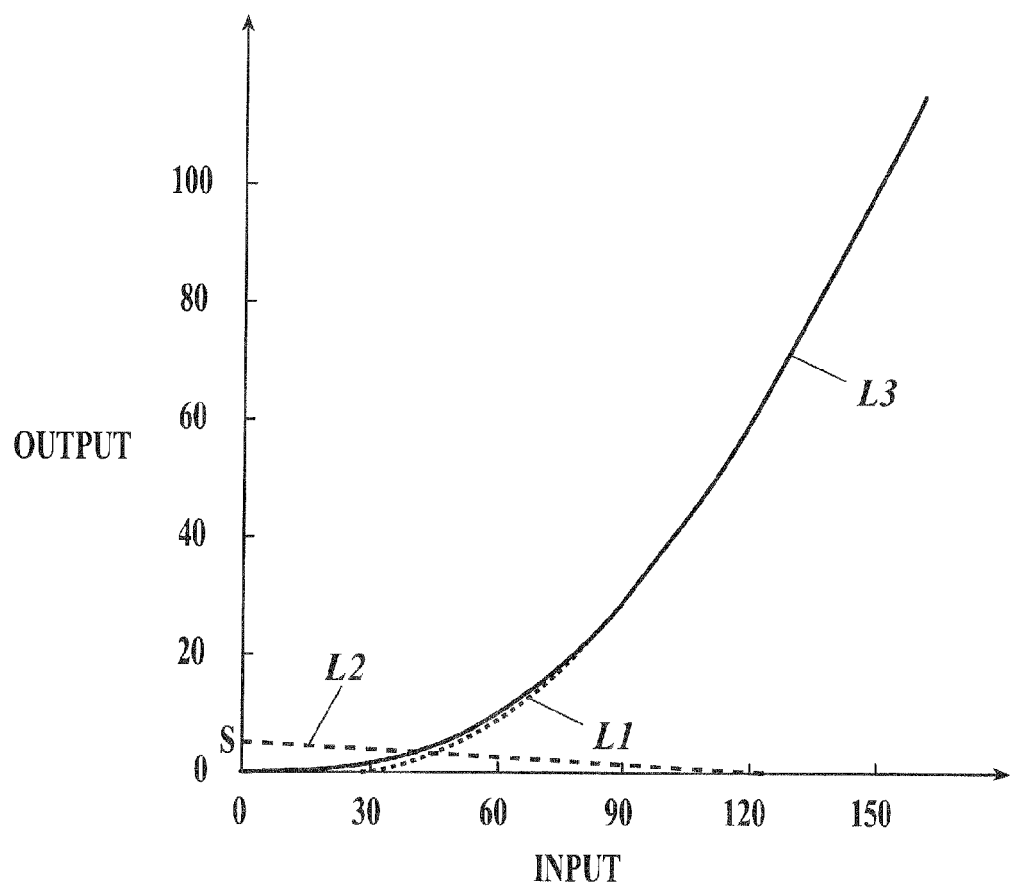
FIG. 3 shows examples of a pre-adjustment gamma curve L1, an offset line L2, and a post-adjustment gamma curve L3.

FIG. 3 shows examples of a pre-adjustment gamma curve L1, an offset line L2, and a post-adjustment gamma curve L3.

As shown in FIG. 3, at the rise part of the pre-adjustment gamma curve L1, an output does not keep up with an input. Then, a straight line (offset line L2) expressed by $y=-Ax+S$ is added as an offset quantity to the pre-adjustment gamma curve L1, so that the rise part is improved as shown by the post-adjustment gamma curve L3 (=L1+L2).

Thus, in the printer gamma offset adjustment, the characteristic of a gamma curve is adjusted by adjusting the value of the "S" (offset value) of the offset line L2.

The nonvolatile memory 151 stores the adjustment item setting processing program and the image reading section selection program of the embodiment, data processed by various programs, offset values for each of the colors, and the like, in addition to various processing programs and various data relative to image formation.

The RAM 152 forms a work area which temporarily stores various programs executed by the control section 150, various data for the programs, and the like. Furthermore, the RAM 152 temporarily stores job data which is generated by the control section 150 based on the image data and the print setting data inputted from the controller 14, or based on the image data inputted from the scan section 11 and the setting information set by the operation display section 12 when the image data is obtained.

The storage section 153 is constituted of a nonvolatile memory such as an HDD (Hard Disk Drive), and stores the connection information, housed paper size information, readable paper size information, selection history information, the adjustment item information, and the like.

The connection information indicates the connection state between the image forming apparatus 1 and each of the image reading sections. In the embodiment, the connection information includes connection information indicating the connection state between the image forming apparatus 1 and the scan section 11, and connection information indicating the connection state between the image forming apparatus 1 and the RU 20.

The housed paper size information is information on the size of paper housed in each of the paper feeding trays.

The readable paper size information is information on the size of paper which can be read by each of the image reading sections (the scan section 11 and the RU 20).

The selection history information is stored for each of the image reading sections (the scan section 11 and the RU 20). The selection history information is the number of times (selected times) that a selection instruction is received by the operation display section 12, the selection instruction to select an image forming section as a test image forming section which reads a test image to perform the image quality adjustment.

The adjustment item information is information on adjustment items necessary to be performed when each of the components (units) of the image forming apparatus 1 is replaced.

FIG. 4 shows an example of the adjustment item information.

As shown in FIG. 4, in the adjustment item information, information on adjustment items necessary to be performed after each of the components is replaced is set.

For example, for the developing unit, toner density sensor initial adjustment, gamma adjustment, and printer gamma offset adjustment are set as adjustment items after developer injection.

The reading processing section 154 performs various types of processing such as analog processing, A/D conversion, and shading on the image data of analog signals inputted from the CCD 111 of the scan section 11, and then generates image data of digital signals.

The compression IC 155 compresses the inputted image data of digital signals.

The DRAM control IC 156 controls the compression on the image data performed by the compression IC 155 and extension on the compressed image data performed by the extension IC 158, and also controls input/output of the image data into/from the image memory 157, in accordance with instructions from the control section 150.

Furthermore, when a keeping instruction to keep image data read by the scan section 11 is inputted from the control section 150, the DRAM control IC 156 allows the compression IC 155 to compress the image data inputted in the reading processing section 154, and stores the compressed image data into a compression memory 157a of the image memory 157. Furthermore, when image data is inputted from the DRAM control IC 142 of the controller 14, the DRAM control IC 156 allows the compression IC 155 to compress the image data, and stores the compressed image data into the compression memory 157a of the image memory 157.

Furthermore, when a printing-out instruction on the compressed image data stored in the compression memory 157a is inputted from the control section 150, the DRAM control IC 156 reads the compressed image data from the compression memory 157a, allows the extension IC 158 to extend the compressed image data, and stores the extended image data into a page memory 157b of the image memory 157. Furthermore, when a printing-out instruction on the image data stored in the page memory 157b is inputted, the DRAM control IC 156 reads the image data from the page memory 157b, and outputs the read image data to the writing processing section 159.

The image memory 157 is constituted of a DRAM (Dynamic RAM), and includes the compression memory 157a and the page memory 157b. The compression memory 157a stores compressed image data. The page memory 157b temporarily stores image data subjected to printing-out, and temporarily stores data received from the controller 14 before the received data is compressed.

The extension IC 158 extends compressed image data.

The writing processing section 159 generates print image data for image formation based on the image data inputted from the DRAM control IC 156, and outputs the generated print image data to the printing section 13.

The RU 20 includes an RU control section 210 and the IDC sensor 211. The IDC sensor 211 is controlled by the RU control section 210. The RU control section 210 controls the IDC sensor 211 so that the IDC sensor 211 reads a test image formed on paper which is carried from the image forming main body apparatus 10, and outputs colorimetric data of each color to the control section 150, in accordance with an instruction inputted from the control section 150 via the printing control section 130.

The finishing apparatus 30 includes the finishing section 311 having various finishing units described above, a carrying section including a carry roller to carry paper to each of the finishing units of the finishing section 311, and the paper ejection tray onto which the paper carried from each of the finishing units of the finishing section 311 is ejected. The finishing units of the finishing section 311 are controlled by a finishing control section 310 as a whole. The finishing control section 310 makes paper carried to a predetermined finishing unit of the finishing section 311 along the paper carry path, and controls drive of the predetermined finishing unit so that the finishing unit performs predetermined finishing on the paper, and the paper is ejected onto the paper ejection tray, in accordance with an instruction signal on the finishing inputted from the control section 150 via the printing control section 130.

Next, operations of the image forming apparatus 1 according to the embodiment are described.

Figure 5:
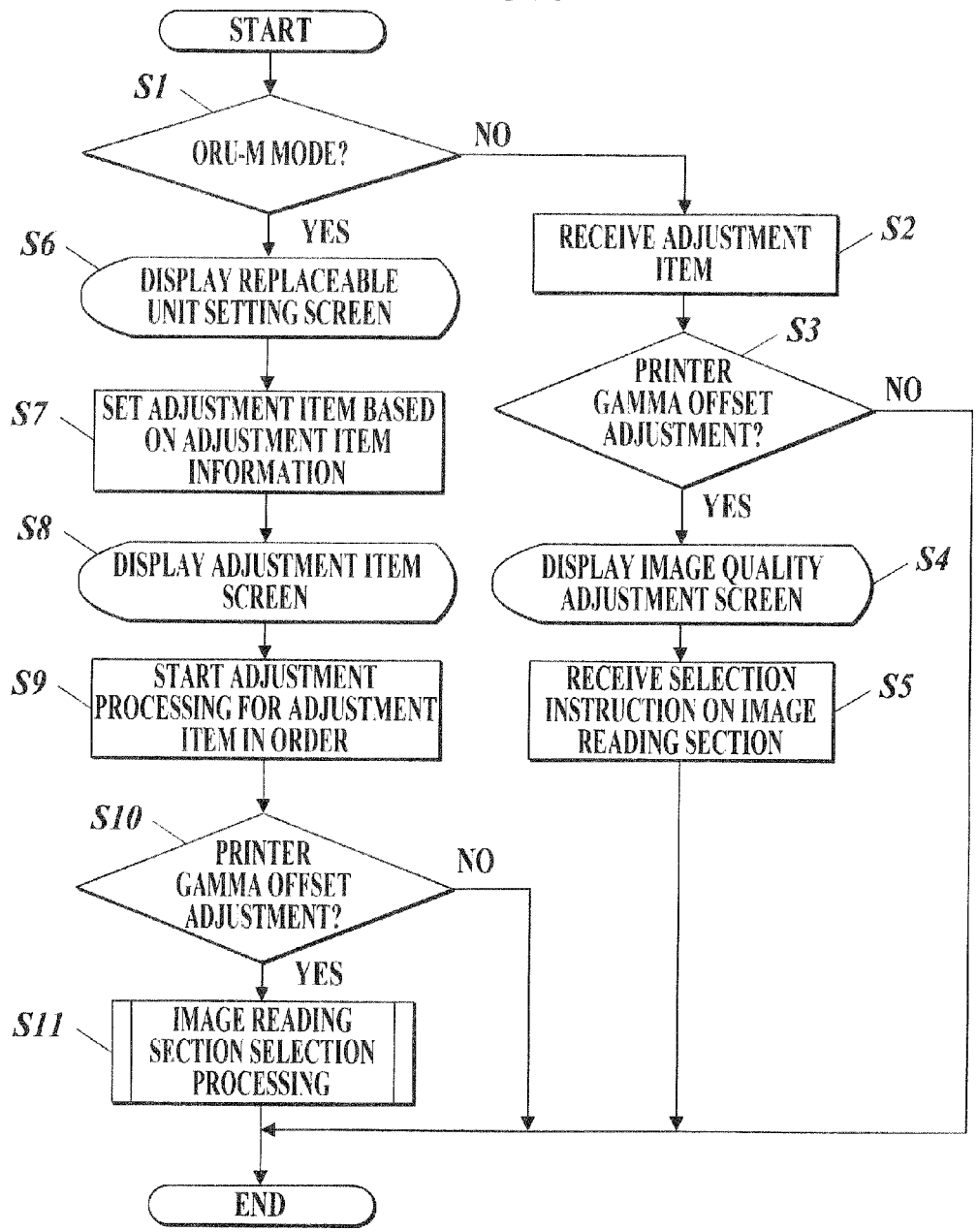
FIG. 5 is a flowchart of adjustment item setting processing.

FIG. 5 is a flowchart of the adjustment item setting processing according to the embodiment.

The adjustment item setting processing shown in FIG. 5 is performed by the control section 150 of the image forming main body apparatus 10 in cooperation with other sections and the like.

The control section 150 judges whether or not an ORU-M bottom is pressed on a menu setting screen displayed on the LCD 121 of the operation display section 12 so as to judge whether or not the ORU-M mode is set (Step S1).

Figure 6:
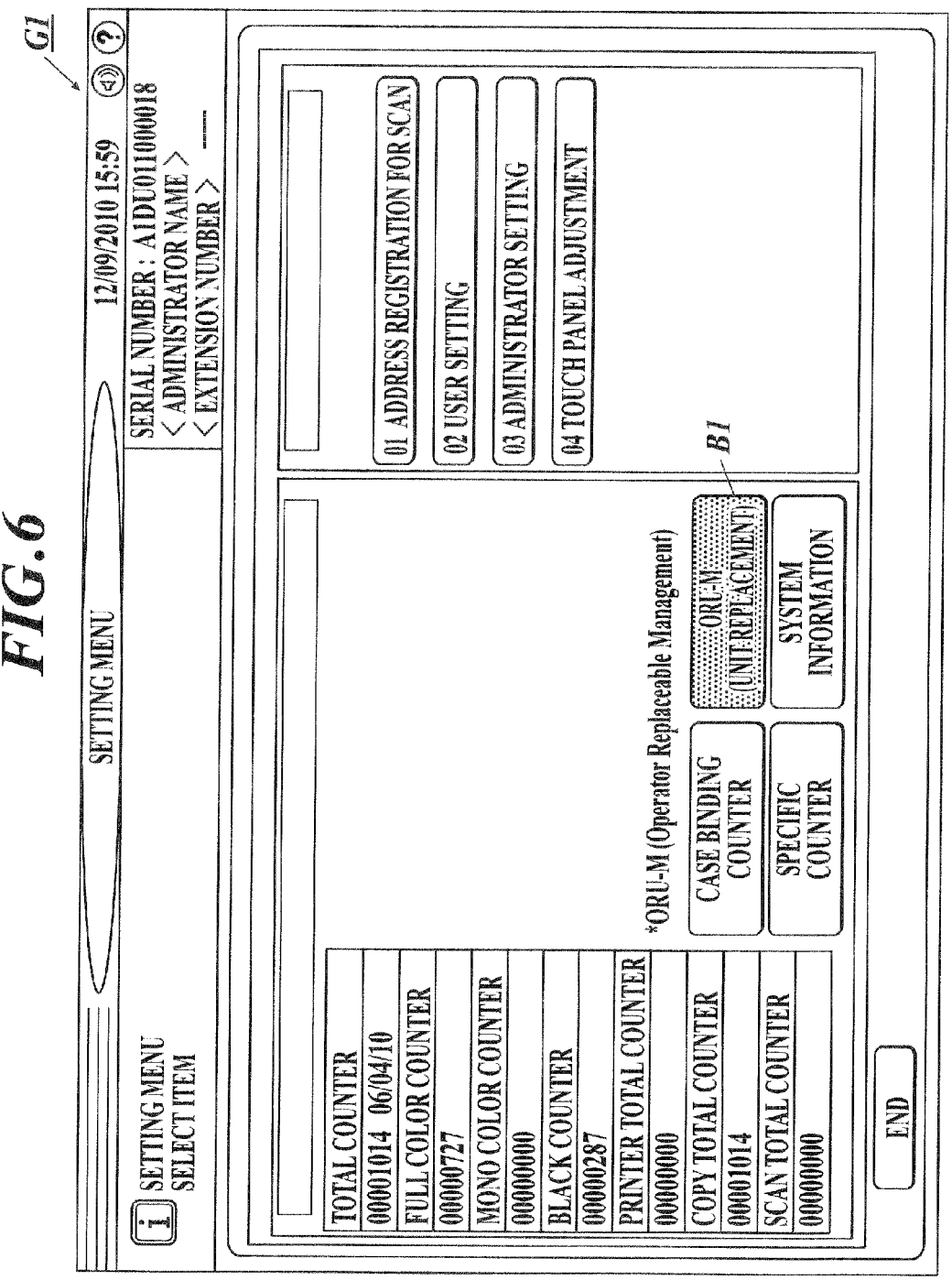
FIG. 6 shows an example of a menu setting screen.

FIG. 6 shows an example of a menu setting screen G1.

As shown in FIG. 6, the menu setting screen G1 includes an ORU-M button B1 to receive a selection instruction to select the ORU-M mode and other various buttons to select items settable to the image forming apparatus 1.

When the ORU-M mode is not set (Step S1; NO), and setting of adjustment items is received by the operation display section 12 (Step S2), the control section 150 judges whether or not printer gamma offset adjustment is included in the received adjustment items (Step S3).

When the printer gamma offset adjustment is not included in the received adjustment items (Step S3; NO), the control section 150 moves to processing for each of the received adjustment items, and ends the adjustment item setting processing. When the printer gamma offset adjustment is included in the received adjustment items (Step S3; YES), the control section 150 displays an image quality adjustment screen on the LDC 121 of the operation display section 12 (Step S4).

Figure 7:
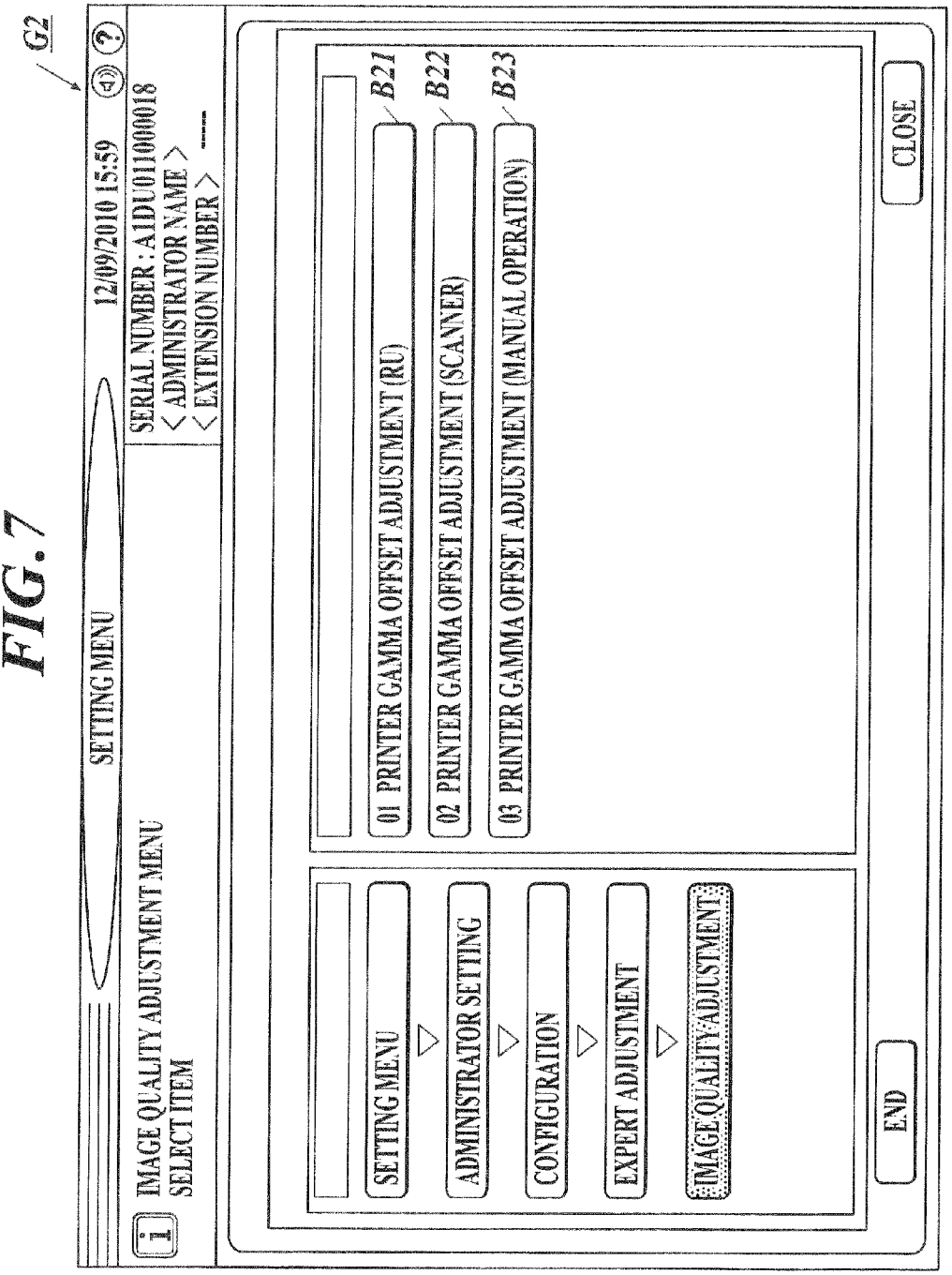
FIG. 7 shows an example of an image quality adjustment screen.

FIG. 7 shows an example of an image quality adjustment screen G2.

As shown in FIG. 7, the image quality adjustment screen G2 includes an RU button B21, a scanner button B22, and a manual operation button B23. When one of the RU button B21, the scanner button B22, and the manual operation button B23 is selected, a selection instruction is received, the selection instruction to select an image reading section (test image reading section) which reads a test image to perform image quality adjustment.

Hence, the operation display section 12 which displays the image quality adjustment screen G2 realizes a function as a selection instruction section.

The RU button B21 receives an instruction to read a test image with the RU 20, and to perform the printer gamma offset adjustment based on the colorimetric data read with the RU 20.

The scanner button B22 receives an instruction to read a test image with the scan section 11, and to perform the printer gamma offset adjustment based on the colorimetric data read with the scan section 11.

The manual operation button B23 receives an instruction to allow a user to visually check a test image, and to perform the printer gamma offset adjustment based on adjustment values inputted by the user from the operation display section 12.

When one of the RU button B21, the scanner button B22, and the manual operation button B23 on the image quality adjustment screen G2 is pressed so that a selection instruction to select an image reading section is received (Step S5), the control section 150 increases the selection history information (the number of selected times) on the image reading section corresponding to the selected button, starts to perform the printer gamma offset adjustment processing with the selected image reading section, and ends the adjustment item setting processing.

On the other hand, when the ORU-M mode is set (Step S1; YES), the control section 150 displays a replaceable unit setting screen on the LDC 121 of the operation display section 12 (Step S6).

FIG. 8 shows an example of a replaceable unit setting screen.

As shown in FIG. 8, a replaceable unit setting screen G3 includes a replaceable unit list region E1.

In the replaceable unit list region E1, information is displayed for each unit replaceable by a user, the information being a unit name, a life cycle, a date of replacement, and a reason for replacement. In addition, in the replaceable unit list region E1, a checkbots In is provided for each unit. The unit with the checkbox marked is set as a unit which has been replaced (replaced unit).

When the replaced unit is set on the replaceable unit setting screen G3, the control section 150 refers to the adjustment item information, and sets adjustment items for the replaced unit (Step S7). Then, the control section 150 displays an adjustment item screen on the LDC 121 of the operation display section 12 (Step S8).

Figure 9:
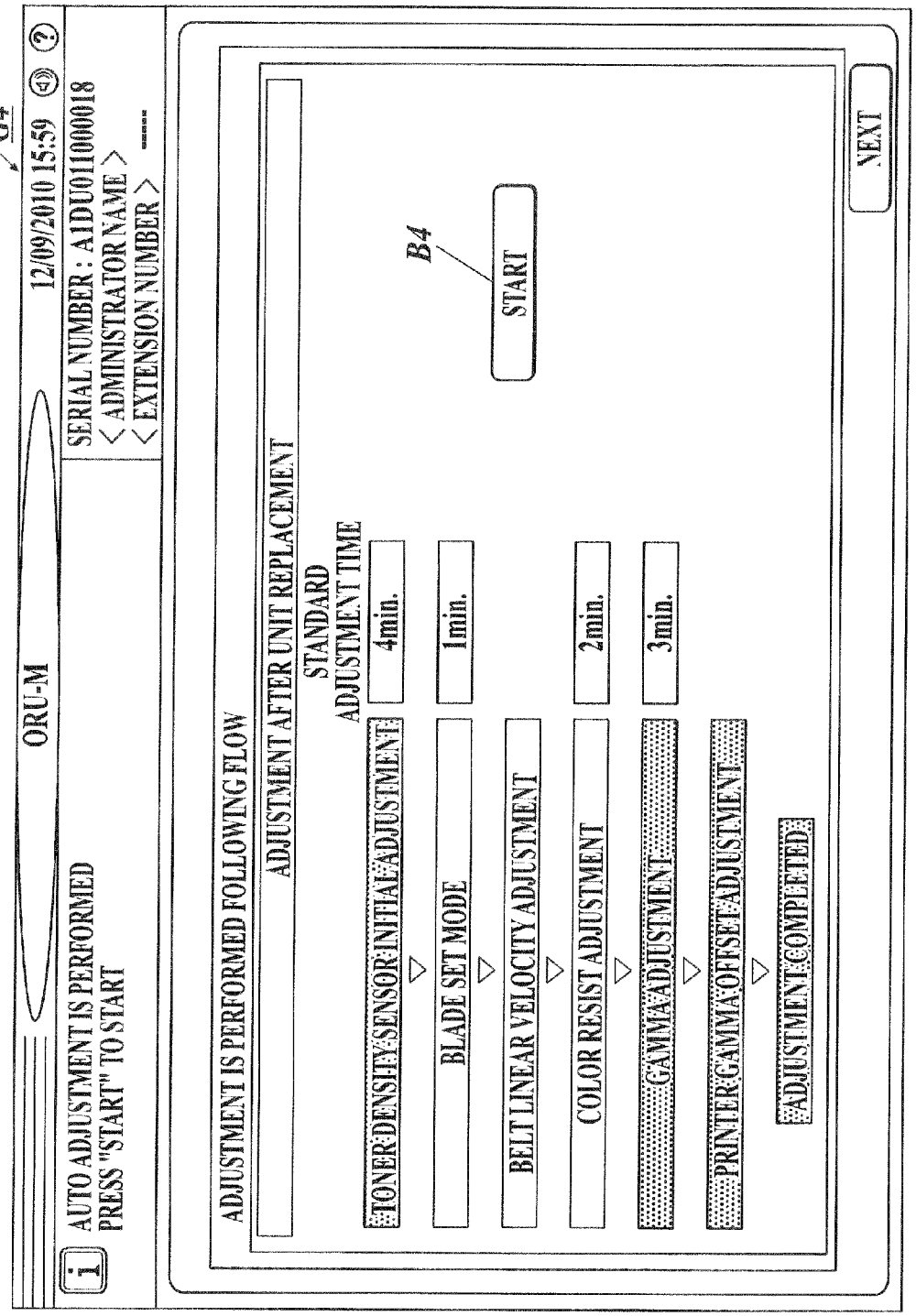
FIG. 9 shows an example of an adjustment item screen.

FIG. 9 shows an example of an adjustment item screen.

An adjustment item screen G4 shown in FIG. 9 is an example of the adjustment item screen in the case where the developing unit is the replaced unit.

As shown in FIG. 9, on the adjustment item screen G4, adjustment items performed after a unit is replaced (in the embodiment, the developing unit), an execution order to perform the adjustment items, and time required to perform each adjustment item are displayed. In addition, the adjustment item screen G4 includes a start button B4.

A user examines the contents displayed on the adjustment item screen G4, and presses the start button B4 to set the adjustment items.

When the start button B4 is pressed, the control section 150 starts to perform adjustment processing for the set adjustment items in the execution order (Step S9). The control section 150 judges whether or not the printer gamma offset adjustment is included in the set adjustment items (Step S10). When the printer gamma offset adjustment is not included therein (Step S10; NO), the control section 150 ends the adjustment item setting processing.

When the printer gamma offset adjustment is included therein (Step S10; YES), the control section 150 performs the image reading section selection processing when starting to perform the printer gamma offset adjustment (Step S11), and ends the adjustment item setting processing.

Figure 10:
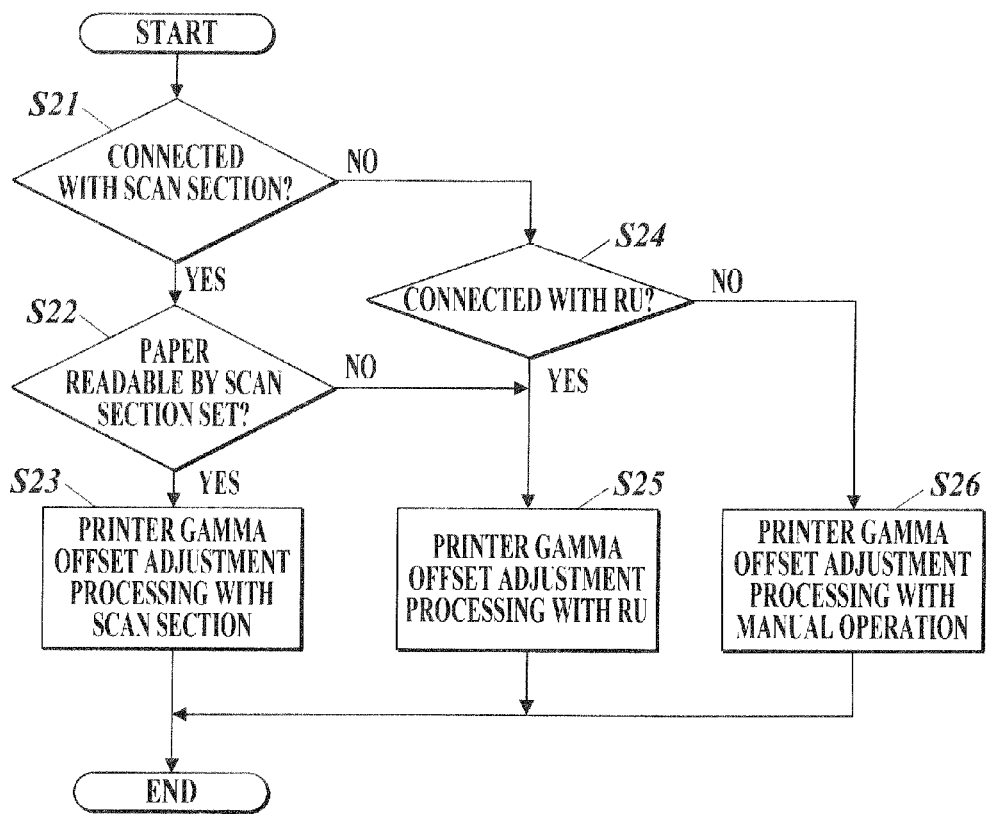
FIG. 10 is a flowchart of image reading section selection processing.
Figure 11:
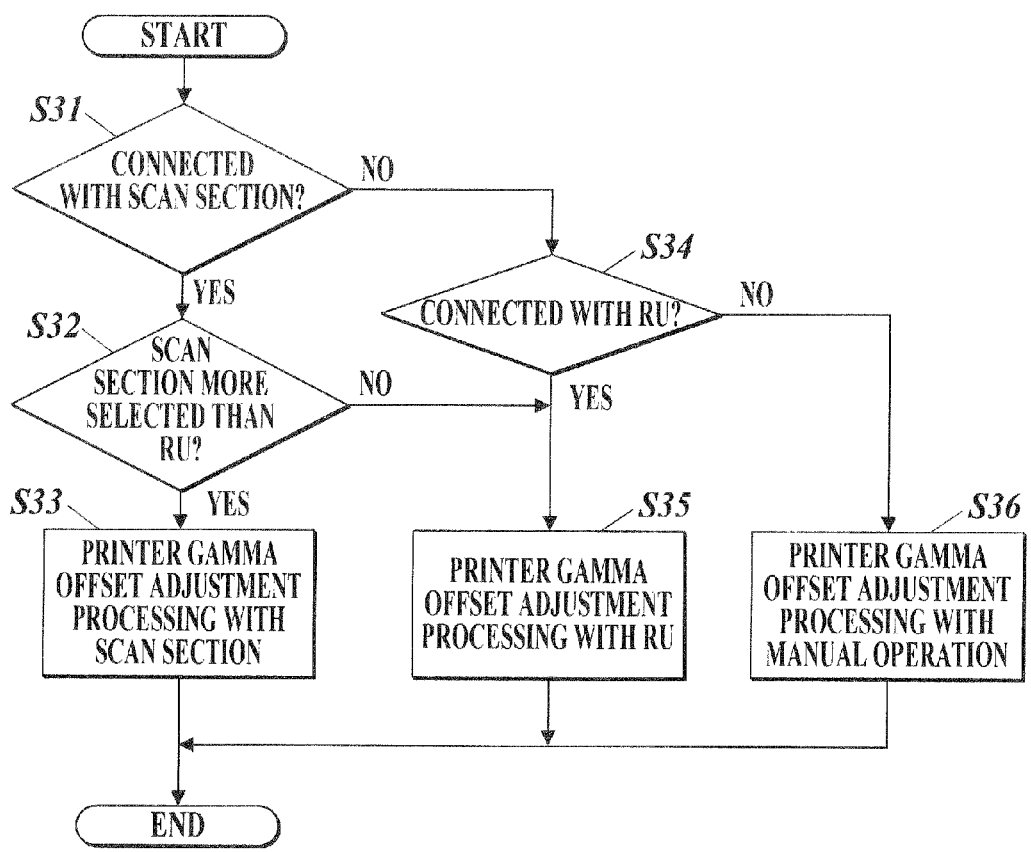
FIG. 11 is a flowchart of image reading section selection processing according to a modification of the embodiment.

FIG. 10 is a flowchart of the image reading section selection processing according to the embodiment. FIG. 11 is a flowchart of the image reading section selection processing according to a modification of the embodiment. The image reading section selection processing shown in FIG. 10 or FIG. 11 is preset to be performed.

The image reading section selection processing shown in each of FIGS. 10 and 11 is performed by the control section 150 of the image forming main body apparatus 10 in cooperation with other sections and the like.

First, the image reading section selection processing is described with reference to FIG. 10.

The control section 150 refers to the connection information stored in the storage section 153, and judges whether or not the scan section 11 is in a connected state (Step S21). When the scan section 11 is in the connected state (Step S21; YES), the control section 150 refers to the readable paper size information on the scan section 11 and the housed paper size information both stored in the storage section 153, and judges whether or not the paper having a size readable by the scan section 11 is set (housed) in any of the paper feeding trays (Step S22).

When the paper having a size readable by the scan section 11 is set in at least one of the paper feeding trays (Step S22; YES), the control section 150 performs the printer gamma offset adjustment processing using the scan section 11 (described below with reference to FIG. 12) (Step S23), and ends the image reading section selection processing.

When the scan section 11 is not in the connected state (i.e. in a disconnected state) (Step S21; NO), the control section 150 refers to the connection information stored in the storage section 153, and judges whether or not the RU 20 is in the connected state (Step S24).

When the RU 20 is in the connected state (Step S24; YES), or when the paper having a size readable by the scan section 11 is not set in any of the paper feeding trays (Step S22; NO), the control section 150 performs the printer gamma offset adjustment processing using the RU 20 (described below with reference to FIG. 15), and ends the image reading section selection processing.

When the RU 20 is not in the connected state (i.e. in the disconnected state) (Step S24; NO), the control section 150 performs the printer gamma offset adjustment processing with manual operation (described below with reference to FIG. 17) based on adjustment values inputted by a user from the operation display section 12 (Step S26), and ends the image reading section selection processing.

Next, the image reading section selection processing according to the modification is described with reference to FIG. 11.

Steps S31 and S33 to S36 shown in FIG. 11 are the same as Steps S21 and S23 to S26 shown in FIG. 10, and hence the description thereof is omitted.

When the scan section 11 is in the connected state (Step S31; YES), the control section 150 refers to the selection history information stored in the storage section 153, and judges whether or not the number of times (selected number) that the scan section 11 is selected as the test image reading section is more than the number of times (selected number) that the RU 20 is selected as the test image reading section (Step S32).

When the selected number of the scan section 11 is more than the selected number of the RU 20 (Step S32; YES), the control section 150 moves to Step S33. When the selected number of the scan section 11 is equal to or less than the selected number of the RU 20 (Step S32; NO), the control section 150 moves to Step S35.

Figure 12:
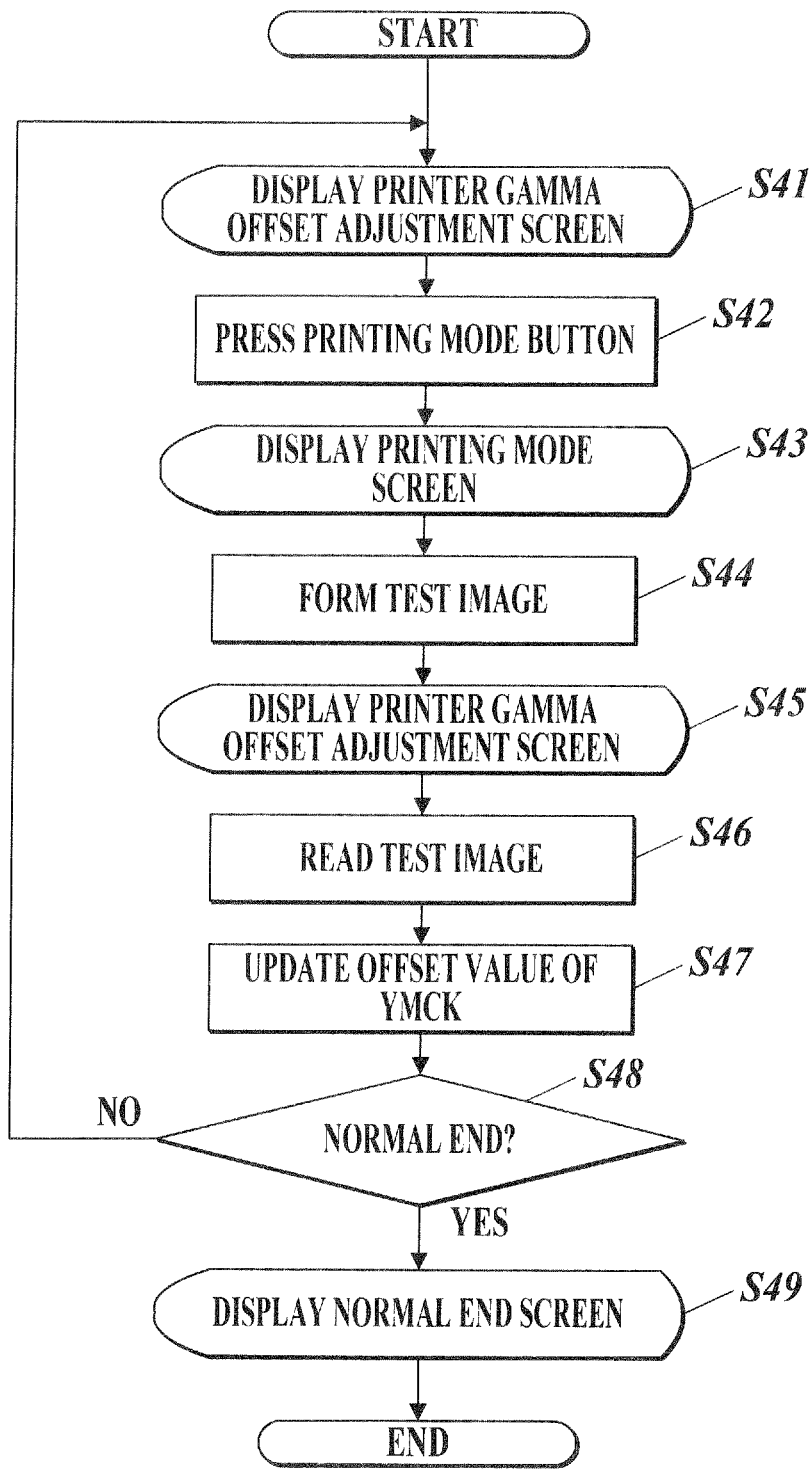
FIG. 12 is a flowchart of printer gamma offset adjustment processing with a scan section.

FIG. 12 is a flowchart of the printer gamma offset adjustment processing with the scan section 11 performed at Steps S23 and S33.

The control section 150 displays a printer gamma offset adjustment screen on the LCD 121 of the operation display section 12 (Step S41).

Figure 13:
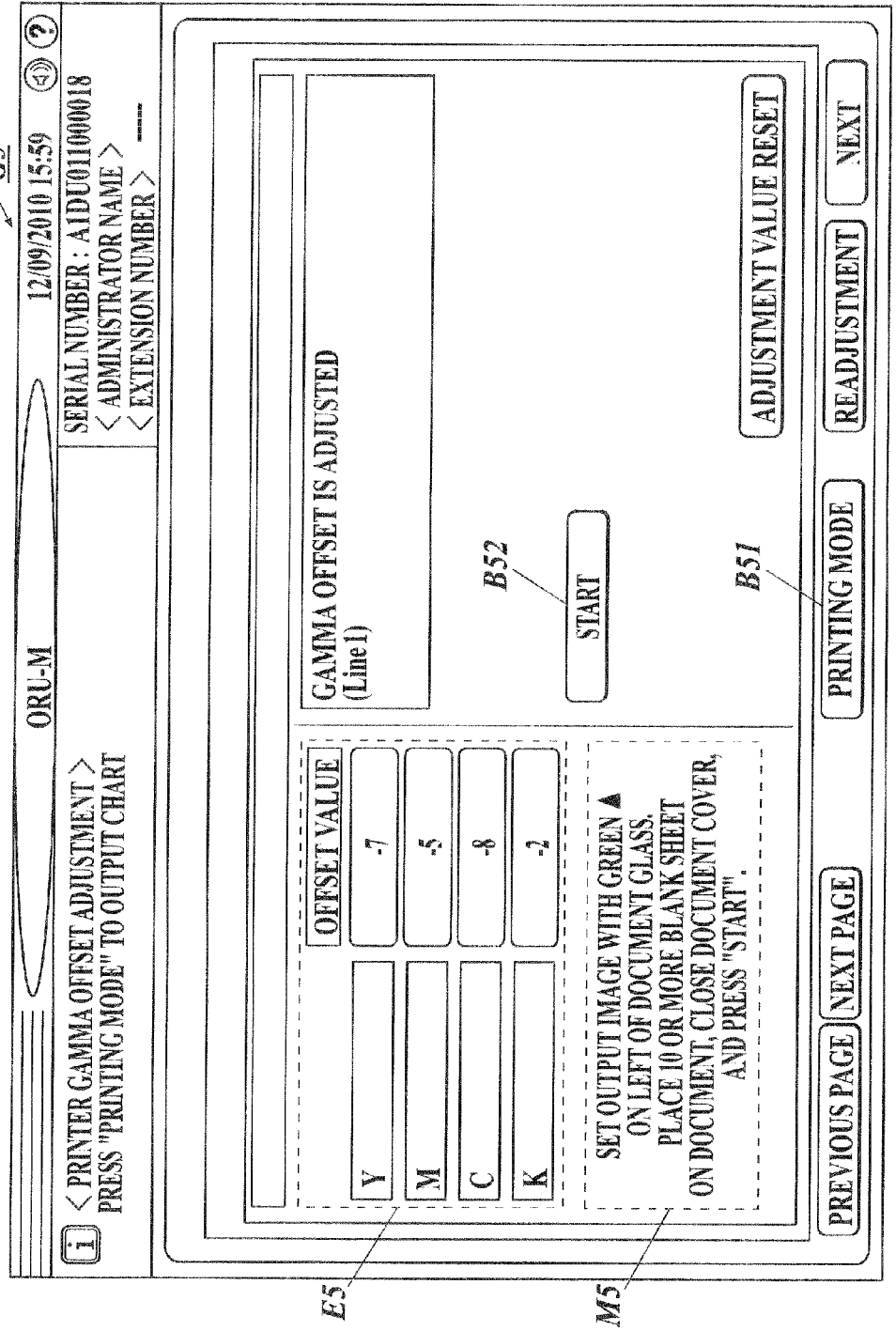
FIG. 13 shows an example of a printer gamma offset adjustment screen.

FIG. 13 shows an example of the printer gamma offset adjustment screen.

As shown in FIG. 13, a printer gamma offset adjustment screen G5 includes an offset value display region E5 in which an offset value for each color is displayed, a message region M5, a printing mode button B1, and a start button B52.

Note that, the message in the message region M5 shown in FIG. 13 is not displayed yet at Step S41.

When the printing mode button B51 is pressed on the printer gamma offset adjustment screen G5 (Step S42), the control section 150 displays a printing mode screen on the LCD 121 of the operation display section 12 (Step S43).

Figure 14:
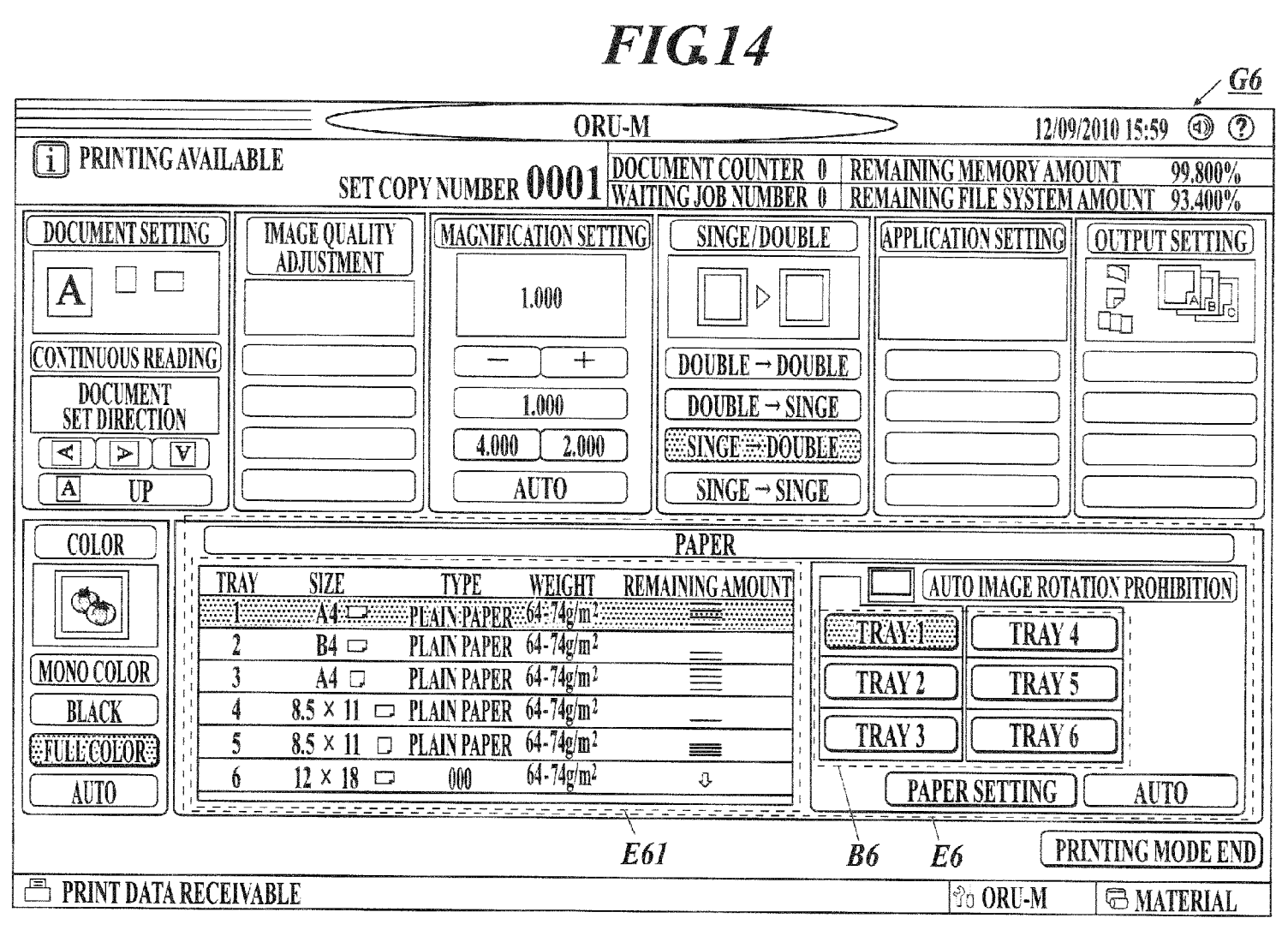

FIG. 14 shows an example of the printing mode screen.

As shown in FIG. 14, a printing mode screen G6 includes a paper selection region E6.

The paper selection region E6 includes a paper type display region E61 in which the size and the type of paper housed in each paper feeding tray are displayed, and a tray selection button set B6.

The tray selection button set B6 is constituted of buttons respectively corresponding to the paper feeding trays, and receives a selection instruction to select a paper feeding tray corresponding to a selected button.

A user refers to the paper selection region E6 on the printing mode screen G6, presses one button of the tray selection button set B6 to input a selection instruction to select a paper feeding tray housing paper on which a test image is to be formed, and presses a start key (not shown) on the operation display section 12.

When one button of the tray selection button set B6 is pressed on the printing mode screen G6, the control section 150 makes a test image formed, the test image which is used for the printer gamma offset adjustment processing with the scan section 11, on the paper housed in the selected paper feeding tray, and makes the paper on which the test image is formed ejected to the paper ejection tray (Step S44).

The test image, which is used for the printer gamma offset adjustment processing with the scan section 11, is constituted of a plurality of preset patch images arranged in a main-scanning direction X and a sub-scanning direction Y. Each of the patch images is made of yellow (Y), magenta (M), cyan (C) and black (B) with the densities thereof varied.

After Step S44, the control section 150 displays the printer gamma offset adjustment screen G5 on the LCD 121 of the operation display section 12 (Step S45). In the message region M5 of the printer gamma offset adjustment screen G5 displayed at Step S45, a message for the user is displayed, the message requesting the user to set the paper on which the test image is formed on a contact glass (document glass) of a reading section of the scan section 11, and to press the start button B52.

The user sets the paper on which the test image is formed on the contact glass of the reading section of the scan section 11 and presses the start button B52 in accordance with the message displayed in the message region M5 of the printer gamma offset adjustment screen G5. When the start button B52 is pressed, the control section 150 makes the scan section 11 read the test image (Step S46).

The control section 150 calculates offset values for yellow (Y), magenta (M), cyan (C) and black (K) based on the image data of the test image read by the scan section 11, updates the offset values for the calculated colors to correct the gamma curves for the colors, and performs grey balance adjustment (Step S47).

The control section 150 judges whether or not the printer gamma offset adjustment ends in a normal way (Step S48). At Step S48, the control section 150 judges that the printer gamma offset adjustment does not end in a normal way when the offset values are not calculated, for example because the test image cannot be read by the scan section 11, the image data thereof cannot be obtained, or the like.

When the printer gamma offset adjustment does not end in a normal way (Step S48; NO), the control section returns to Step S41. When the printer gamma offset adjustment ends in a normal way (Step S48; YES), the control section 150 displays a normal end screen (not shown), which indicates that the printer gamma offset adjustment ends in a normal way, on the LCD 121 of the operation display section 12 (Step S49), and ends the printer gamma offset adjustment processing with the scan section 11.

Figure 15:
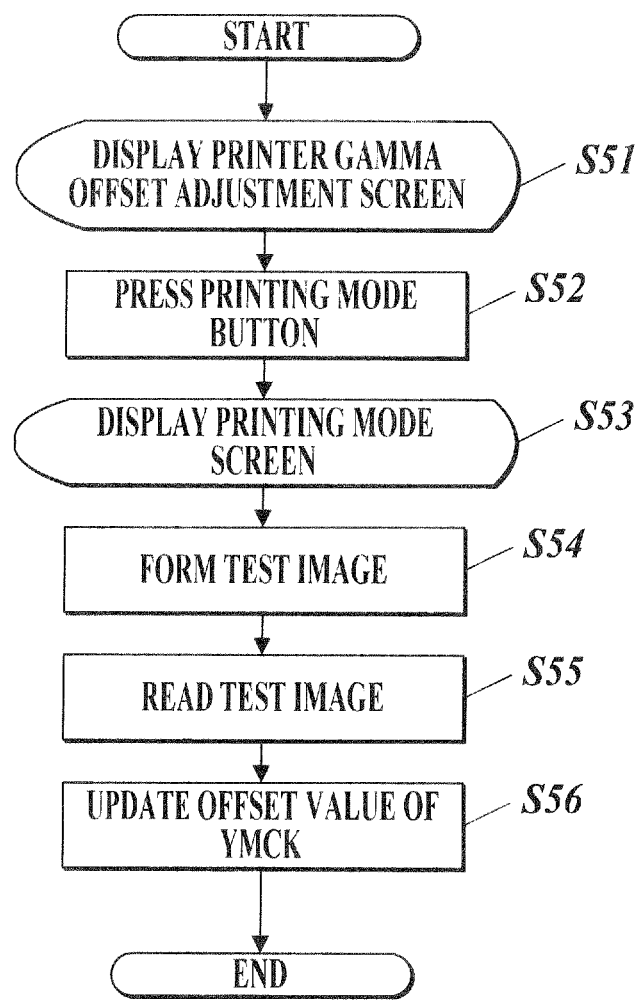
FIG. 15 is a flowchart of printer gamma offset adjustment processing with an RU.

FIG. 15 shows a flowchart of the printer gamma offset adjustment processing with the RU 20 performed at Steps S25 and S35.

The control section 150 displays a printer gamma offset adjustment screen on the LDC 121 of the operation display section 12 (Step S51).

Figure 16:
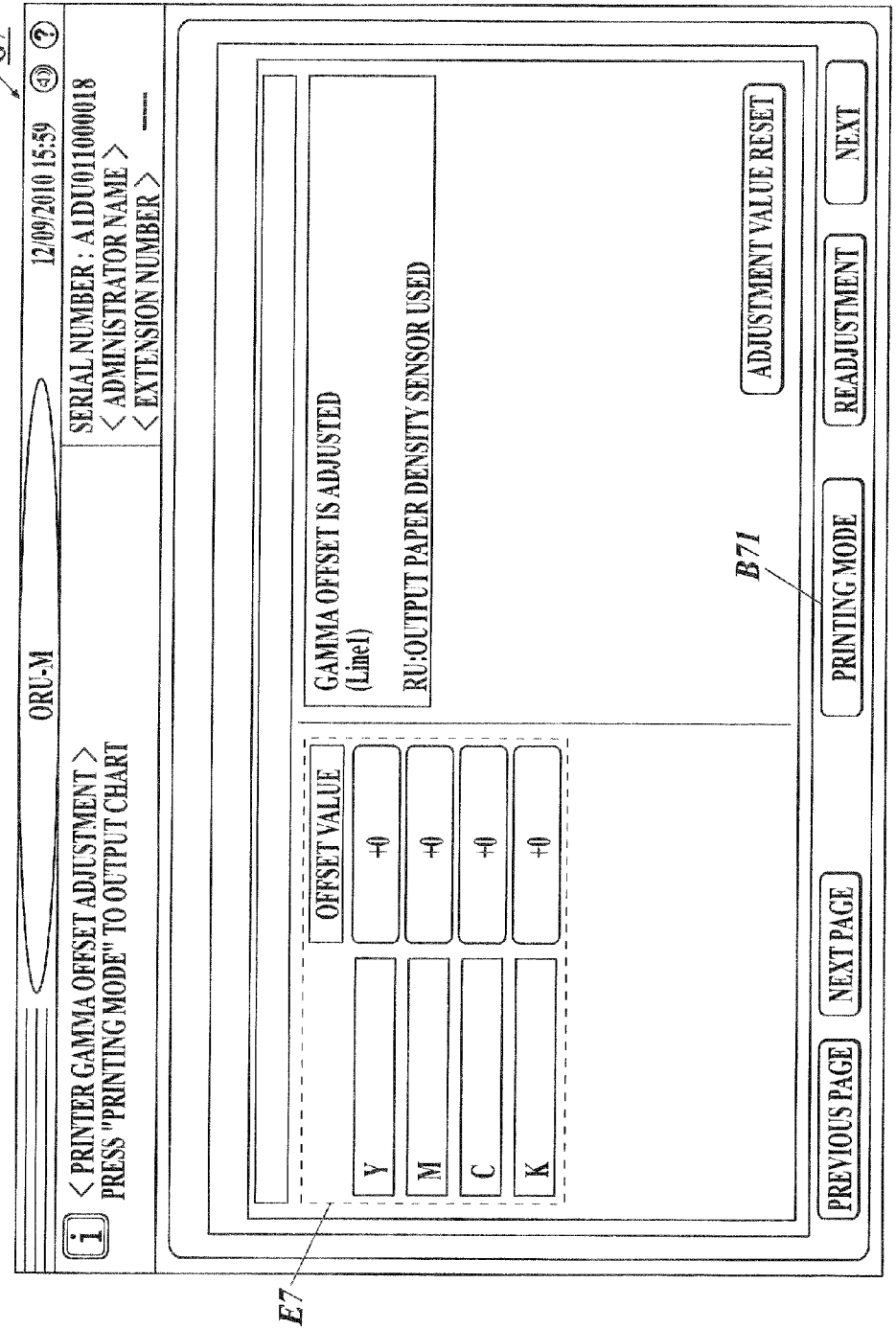
FIG. 16 shows an example of a printer gamma offset adjustment screen.

FIG. 16 shows an example of the printer gamma offset adjustment screen.

As shown in FIG. 16, a printer gamma offset adjustment screen G7 includes an offset value display region E7 in which an offset value for each color is displayed, and a printing mode button B71.

When the printing mode button B71 is pressed on the printer gamma offset adjustment screen G7 (Step S52), the control section 150 displays a printing mode screen on the LCD 121 of the operation display section 12 (Step S53).

The printing mode screen displayed at Step S53 is the same as the printing mode screen displayed at Step S43 and shown in FIG. 14, and hence the figure and description thereof are omitted.

In addition, user's operations on the printing mode screen which is displayed at Step S53 are the same as user's operations on the printing mode screen which is displayed at Step S43, and hence the description thereof is omitted.

When one button of the tray selection button set B6 is pressed on the printing mode screen G6, the control section 150 makes a test image formed, the test image which is used for the printer gamma offset adjustment with the RU 20, on the paper housed in the selected paper feeding tray, and makes the paper on which the test image is formed ejected to the paper ejection tray (Step S54).

The test image, which is used for the printer gamma offset adjustment processing with the RU 20, is described.

The IDC sensor 211 of the RU 20 cannot measure the density of a mixed color of yellow (Y), magenta (M), cyan (C) and black (K). Hence, the test image is constituted of color patch image sets for yellow (Y), magenta (M), cyan (C) and black (K). For example, the test image is constituted of a yellow (Y) patch image set, a magenta (M) patch image set, a cyan (C) patch image set, and a black (K) patch image set arranged in the sub-scanning direction Y, and each color patch image set is constituted of a plurality of patch images arranged in the main-scanning direction X in such a way that the densities (gradations) of the patch images become gradually lighter or darker in the main-scanning direction X.

The control section 150 makes the RU 20 read the test image formed on paper by the printing section 13 of the image forming main body apparatus 10 (Step S55).

When the paper on which the test image is formed is carried from the printing section 13, the RU 20 reads the test image with the IDC sensor 211, generates colorimetric data, and outputs the colorimetric data to the control section 150.

The control section 150 calculates offset values for yellow (Y), magenta (M), cyan (C) and black (K) based on the colorimetric data inputted from the RU 20, updates the offset values for the calculated colors to correct the gamma curves for the colors (Step S56), and ends the printer gamma offset adjustment processing with the RU 20.

Figure 17:
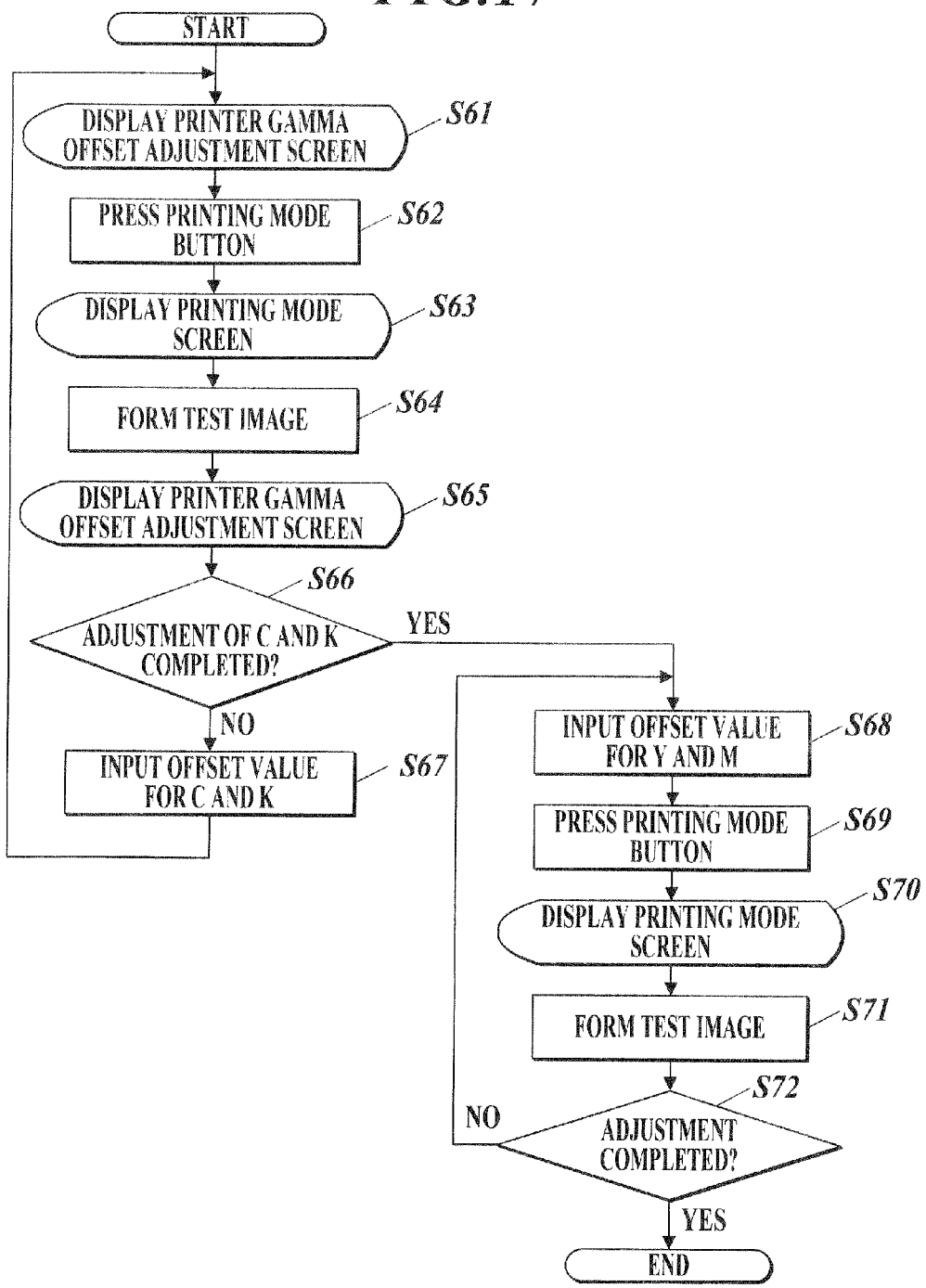
FIG. 17 is a flowchart of manual printer gamma offset adjustment processing with manual operation.

FIG. 17 shows a flowchart of the printer gamma offset adjustment processing with manual operation performed at Steps S26 and S36.

The control section 150 displays a printer gamma offset adjustment screen on the LCD 121 of the operation display section 12 (Step S61).

Figure 18:
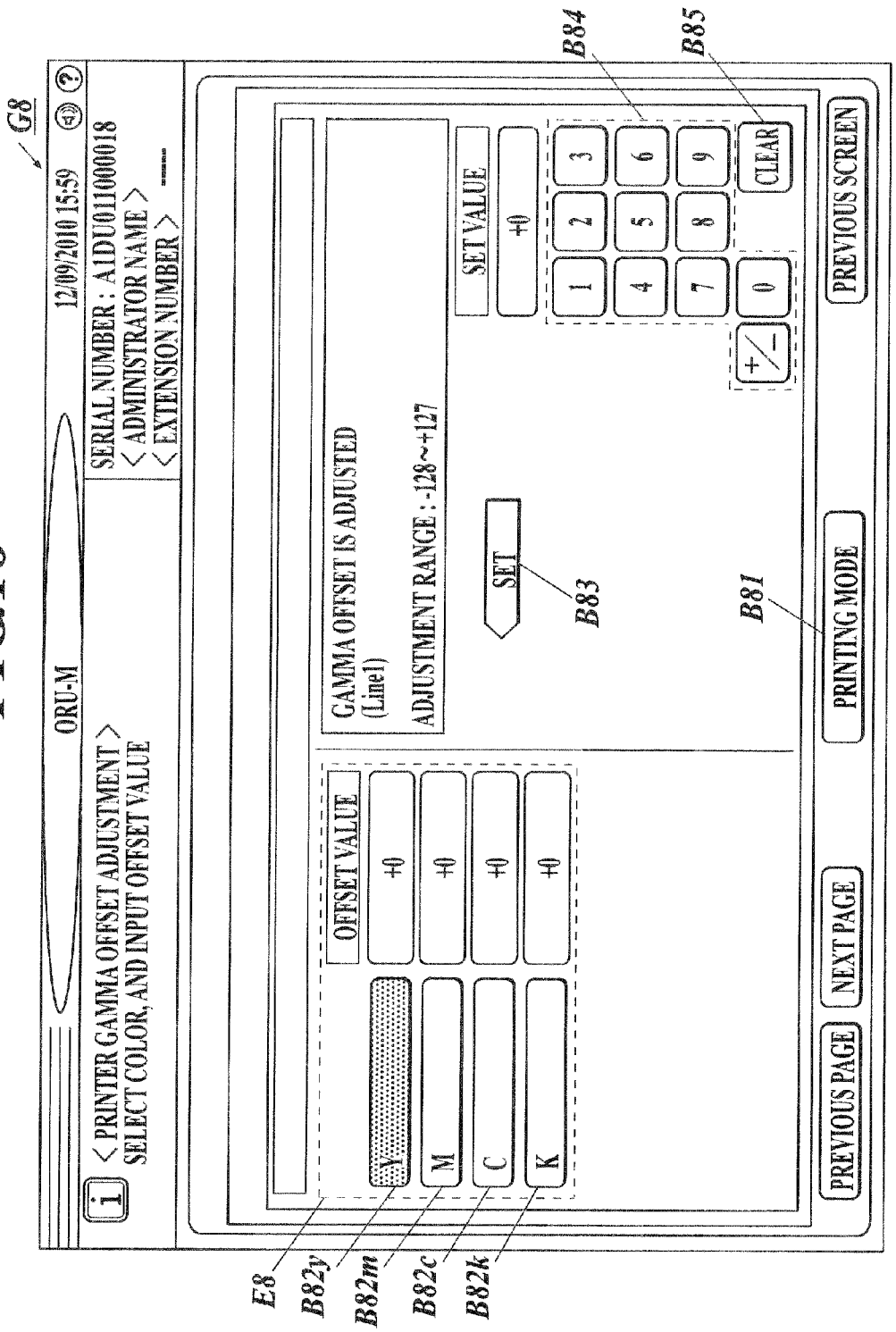
FIG. 18 shows an example of a printer gamma offset adjustment screen.

FIG. 18 shows an example of the printer gamma offset adjustment screen.

As shown in FIG. 18, a printer gamma offset adjustment screen G8 includes an offset value display region E8 in which an offset value for each color is displayed, a printing mode button B81, a set button B83, a numeral keypad B84, and a clear button B85. The offset value display region E8 includes color buttons B82y, B82m, B82c and B82k for the colors of yellow (Y), magenta (M), cyan (C) and black (K) to specify a color, the offset value of which is changed.

When the printing mode button B81 is pressed on the printer gamma offset adjustment screen G8 (Step S62), the control section 150 displays a printing mode screen on the LCD 121 of the operation display section 12 (Step S63).

The printing mode screen displayed at Step S63 is the same as the printing mode screen displayed at Step S43 and shown in FIG. 14, and hence the figure and description thereof are omitted.

In addition, user's operations on the printing mode screen which is displayed at Step S63 are the same as user's operations on the printing mode screen which is displayed at Step S43, and hence the description thereof is omitted.

When one button of the tray selection button set B6 is pressed on the printing mode screen G6, the control section 150 makes a test image formed, the test image which is used for the printer gamma offset adjustment processing with manual operation, on the paper housed in the selected paper feeding tray, and makes the paper on which the test image is formed ejected to the paper ejection tray (Step S64).

Figure 19:
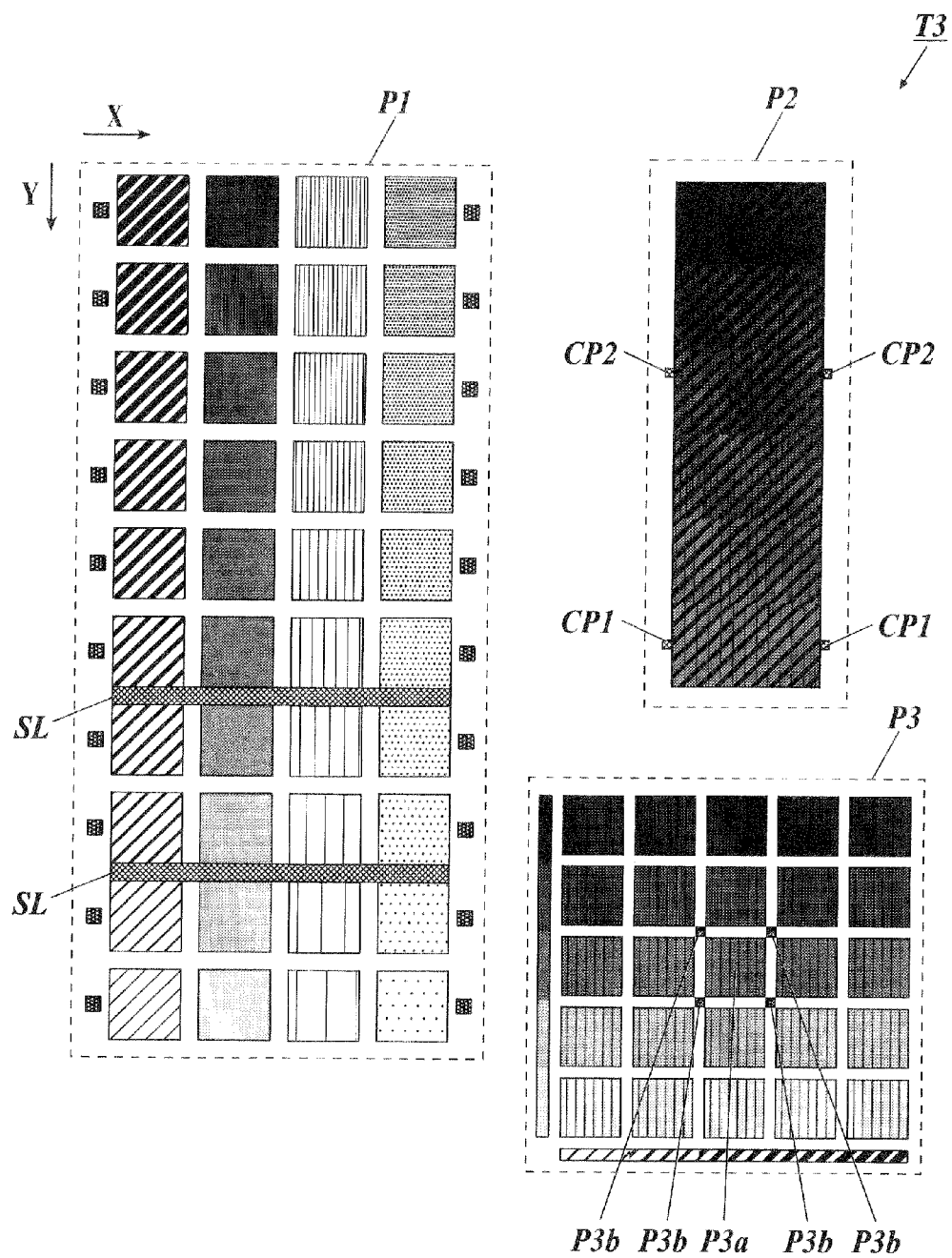
FIG. 19 shows an example of a test image.

FIG. 19 shows an example of a test image T3 formed at Step S64.

The test image T3 is constituted of a patch image set P1, a grey gradation pattern P2, and a grey patch set P3.

The patch image set P1 is constituted of color patch image sets for yellow (Y), magenta (M), cyan (C) and black (K). In FIG. 19, a yellow (Y) patch image set, a magenta (M) patch image set, a cyan (C) patch image set, and a black (K) patch image set are arranged in the main-scanning direction X. Each color patch image set is constituted of a plurality of patch images, and the patch images are arranged in such a way that the density (gradation) becomes gradually lighter or darker in the sub-scanning direction Y. The patch image set P1 includes two standard lines SL.

The grey gradation pattern P2 is an image showing gradation change of grey made of yellow (Y), magenta (M) and cyan (C). The grey gradation pattern P is formed in such a way that the density (gradation) becomes lighter or darker in the sub-scanning direction Y. In addition, the grey gradation pattern P2 includes check points CP1 and CP2.

The grey patch set P3 is constituted of a plurality of grey patch images. Each grey patch image is made of yellow (Y), magenta (M) and cyan (C). The grey patch images are arranged in such a way that the density of magenta (M) becomes lighter in the sub-scanning direction Y, the density of yellow (Y) becomes darker in the main-scanning direction X, and the density of cyan (C) is uniform. The color of a grey patch image P3a at the center of the grey patch set P3 is the same as the color of the grey gradation pattern P2 at the positions CP1. Furthermore, the colors of four sub-patch images P3b disposed at four corners of the grey patch image P3a is the same as the color of the grey gradation pattern P2 at the positions CP2.

After Step S64, the control section 150 displays the printer gamma offset adjustment screen G8 on the LCD 121 of the operation display section 12 (Step S65), and judges whether or not the adjustment of cyan (C) and black (K) is completed (Step S66).

At Step S66, when the offset values for cyan (C) and black (K) are received on the printer gamma offset adjustment screen G8, it is judged that the adjustment of cyan (C) and black (K) is not completed.

When the adjustment of cyan (C) and black (K) is not completed (Step S66; NO), the control section 150 receives the offset values for cyan (C) and black (K) inputted by press operations on the printer gamma offset adjustment screen G8, updates the offset values (Step S67), and returns to Step S61.

At Step S67, a user pays attention to the patch image set P1, and judges whether or not a first adjustment condition is satisfied, the first adjustment condition that the positions at which cyan (C) and black (K) appear, namely, the highlight parts of cyan (C) and black (K) are expressed, are the same, and the densities thereof between the two standard lines are the same. When the first adjustment condition is not satisfied, the user presses a color button for the color which the user desires to adjust (the color button B82c for cyan (C) or the color bottom B82k for black (K)), presses the numeric keypad B84 to input the offset value for the color, and presses the set button B83. When the set button B83 is pressed, the offset value inputted by the numeric keypad B84 is fixed, and received.

When the adjustment of cyan (C) and black (K) is completed (Step S66; YES), the control section 150 receives the offset values for yellow (Y) and magenta (M) inputted by press operations on the printer gamma offset adjustment screen G8, and updates the offset values (Step S68).

At Step S68, the user pays attention to the grey gradation pattern P2 and the grey patch set P3, and selects, from among the plurality of grey patch images, a grey patch image having the same hue as the sub-patch images P3b. Then, the user presses a color button for the color which the user desires to adjust (the color button B82y for yellow (Y) or the color button B82m for magenta (M)) based on the position of the selected grey patch image to the position of the grey patch image P3a, which is located at the center of the grey patch set P3, in view of the arrangement and position relation of the grey patch images in the grey patch set P3, presses the numeric keypad B84 to input the offset value for the color, and presses the set button B83.

For example, when the selected grey patch is located at a position at which the density of magenta (M) is darker than the grey patch image (P3a) at the center in the grey patch set P3, the color button B82m for magenta is pressed, the numeric key pad B84 is pressed to input a positive value as the offset value, and the set button B83 is pressed.

Thus, the printer gamma offset adjustment screen G8 realizes a function as an input section which receives the information on the image quality adjustment (offset values for Y, M, C and K) based on a test image.

After Step S68, when the printing mode button B81 is pressed (Step S69), the control section 150 displays a printing mode screen on the LCD 121 of the operation display section 12 (Step S70).

The printing mode screen displayed at Step S70 is the same as the printing mode screen displayed at Step S43 and shown in FIG. 14, and hence the figure and description thereof are omitted.

In addition, user's operations on the printing mode screen which is displayed at Step S70 are the same as user's operations on the printing mode screen which is displayed at Step S43, and hence the description thereof is omitted.

When one button of the tray selection button set B6 is pressed and the start key (not shown) is pressed on the printing mode screen G6, the control section 150 makes a test image formed, the test image which is used for the printer gamma offset adjustment processing with manual operation, on the paper housed in the selected paper feeding tray, and makes the paper on which the test image is formed ejected to the paper ejection tray (Step S71).

The test image formed at Step S71 is the same as the test image formed at Step S64 and shown in FIG. 19, and hence the figure and description thereof are omitted.

After Step S71, the control section 150 displays the printer gamma offset adjustment screen G8 on the LCD 121 of the operation display section 12, and judges whether or not the printer gamma offset adjustment with manual operation is completed (Step S72).

At Step S72, when the offset values for yellow (Y) and magenta (M) are received on the printer gamma offset adjustment screen G8, it is judged that printer gamma offset adjustment with manual operation is not completed.

When the printer gamma offset adjustment with manual operation is not completed (Step S72; NO), the control section 150 returns to Step S68. When the manual printer gamma offset adjustment is completed (Step S72; YES), for example, when an OK button (not shown) on the operation display section 12 is pressed, the control section 150 ends the printer gamma offset adjustment processing with manual operation.

As described above, according to the embodiment, one of a plurality of image reading sections (the scan section 11 and the RU 20) can be selected based on the connection information indicating a connection state between each of the image reading sections and the image forming apparatus 1, a test image can be read by the selected test image reading section, and the image quality adjustment can be performed based on the read test image. Accordingly, user's workload to perform the adjustment processing can be reduced, and hence user's work efficiency can be increased.

Furthermore, one of a plurality of image reading sections can be selected based on the housed paper size information indicating the size of paper housed in each of the paper feeding trays, the paper on which a test image is formed, and based on the readable paper size information indicating the size of paper readable by each of the image reading sections.

For example, in the case where the scan section 11 is in the connected state, the scan section 11 can be selected only when the paper having a size which can be read by the scan section 11 is set in at least one of the paper feeding trays, based on the housed paper size information and the readable paper size information on the scan section 11. Accordingly, the situation at which the scan section 11 cannot read a test image can be avoided.

Furthermore, one of a plurality of image reading sections can be selected based on the selection history information. Accordingly, the image quality adjustment can be performed by using an image reading section which a user himself/herself selects more times than another image reading section to perform the printer gamma offset adjustment, and hence the image quality adjustment can be performed by using an image reading section which the user prefers.

Furthermore, as shown in FIGS. 10 and 11, after the connection state of the scan section 11 is judged (Steps S21 and S31), the connection state of the RU 20 is judged (Steps S24 and S34). Accordingly, when both the scan section 11 and the RU 20 are in the connected state, the scan section 11 is prior to the RU 20, and selected.

If the RU 20 is higher than the scan section 11 in the image reading accuracy, the RU 20 may be prior to the scan section 11 and selected by judging the connection state of the scan section 11 after judging the connection state of the RU 20.

Furthermore, when both the image reading sections (the scan section 11 and the RU 20) are not in the connected state, the image quality adjustment can be performed based on the information on the image quality adjustment (offset values for Y, M, C and K) received by the printer gamma offset adjustment screen G8 shown in FIG. 18.

Furthermore, when an item indicating the image quality adjustment (printer gamma offset adjustment) is included in the adjustment item information on the replaced unit, the image reading section selection processing can be performed. Accordingly, the adjustments necessary for the replaced unit can be automatically performed, and hence user's workload can be reduced.

In the embodiments of the present invention, a nonvolatile memory is used as a computer readable medium which stores the programs of the processing. However, this is not a limit. For example, a nonvolatile memory such as a flash memory or a portable recording medium such as a CD-ROM can be used as the computer readable medium. Furthermore, a carrier wave can be used as a medium which provides the data of the programs of the processing via a communication line.

The present invention is not limited to the embodiments, and hence can be appropriately modified without departing from the scope of the present invention.

According to a first aspect of an embodiment of the present invention, there is provided an image forming apparatus including: an image forming section which forms an image on paper; a plurality of image reading sections each of which reads the image formed on the paper, and is connectable to the image forming apparatus; a storage section which stores connection information on a connection state between each of the image reading sections and the image forming apparatus; and a control section which selects a test image reading section from among the image reading sections based on the connection information, makes the selected test image reading section read a test image formed by the image forming section, and performs image quality adjustment based on the read test image.

According to the image forming apparatus, user's workload to perform adjustment processing can be reduced, and hence user's work efficiency can be increased.

Preferably, the image forming apparatus further includes: a paper feeding section including a plurality of paper feeding trays which house paper size by size to feed the paper so that the test image is formed on the paper by the image forming section, wherein the storage section stores housed paper size information on a size of the paper housed in each of the feeding paper trays, and readable paper size information on a size of paper readable by each of the image reading sections, and the control section selects the test image reading section from among the image reading sections based on the housed paper size information and the readable paper size information.

Preferably, the image forming apparatus further includes: a selection instruction section which receives a selection instruction to select the test image reading section from among the image reading sections so that the image quality adjustment is performed, wherein the storage section stores selection history information on a number of the selection instruction received by the selection instruction section with respect to each of the image reading sections; and the control section selects the test image reading section from among the image reading sections based on the selection history information.

Preferably, in the image forming apparatus, the image reading sections include a first image reading section which reads the image formed on the paper, and a second image reading section which is disposed on a paper carry path and reads the image formed on the paper in being carried, and the control section selects the first image reading section as the test image reading section when the first image reading section and the second image reading section are in a connected state.

Preferably, the image forming apparatus further includes: an input section which receives information on the image quality adjustment based the test image formed by the image forming section, and the control section performs the image quality adjustment based on the information on the image quality adjustment received by the input section when the first image reading section and the second image reading section are not in the connected state.

Preferably, in the image forming apparatus, the storage section stores adjustment item information on an adjustment item for a component of the image forming apparatus, the adjustment item which is necessary to be performed when the component is replaced, and when the image quality adjustment is included in the adjustment item information for the replaced component, the control section selects the test image reading section from among the image reading sections based on the connection information, makes the selected test image reading section read the test image formed by the image forming section, and performs the image quality adjustment based on the read test image.

According to a second aspect of the embodiment of the present invention, there is provided an image quality adjustment method of an image forming apparatus connectable with a plurality of image reading sections each of which reads an image formed on paper, the method including: selecting a test image reading section from among the image reading sections based on connection information on a connection state between each of the image reading sections and the image forming apparatus; reading a test image formed on the paper with the selected test image reading section; and performing image quality adjustment based on the read test image.

According to the image quality adjustment method, user's workload to perform adjustment processing can be reduced, and hence user's work efficiency can be increased.

The present application is based upon and claims the benefit of priority under 35 U.S.C. 119 of Japanese Patent Application No. 2011-025538 filed on Feb. 9, 2011, the entire disclosure of which, including the description, claims, drawings, and abstract, is incorporated herein by reference in its entirety.

What is claimed is:

1. An image forming apparatus comprising:
an image forming section which forms an image on paper;
a plurality of image reading sections each of which is operable to read the image formed on the paper, and is connectable to the image forming apparatus;
a storage section which stores connection information on a connection state between each of the image reading sections and the image forming apparatus; and
a control section which selects a test image reading section from among the image reading sections based on the connection information, performs control for the selected test image reading section to read a test image formed by the image forming section, and performs image quality adjustment based on the read test image.

2. The image forming apparatus according to claim 1 further comprising:
a paper feeding section including a plurality of paper feeding trays which house paper size by size to feed the paper so that the test image is formed on the paper by the image forming section,
wherein the storage section stores housed paper size information on a size of the paper housed in each of the paper feeding trays, and readable paper size information on a size of paper readable by each of the image reading sections, and
wherein the control section selects the test image reading section from among the image reading sections based on the housed paper size information and the readable paper size information.

3. The image forming apparatus according to claim 1 further comprising:
a selection instruction section which receives a selection instruction to select the test image reading section from among the image reading sections to perform the image quality adjustment,
wherein the storage section stores selection history information on a number of receptions of the selection instruction received by the selection instruction section with respect to each of the image reading sections, and
wherein the control section selects the test image reading section from among the image reading sections based on the selection history information.

4. The image forming apparatus according to claim 1, wherein the image reading sections include a first image reading section which reads the image formed on the paper, and a second image reading section which is disposed on a paper carry path and reads the image formed on the paper while the paper is being carried on the paper carry path, and
wherein the control section selects the first image reading section as the test image reading section when the first image reading section and the second image reading section are in a connected state.

5. The image forming apparatus according to claim 1 further comprising:
an input section which receives information on the image quality adjustment based on the test image formed by the image forming section,
wherein the control section performs the image quality adjustment based on the information on the image quality adjustment received by the input section when the first image reading section and the second image reading section are not in the connected state.

6. The image forming apparatus according to claim 1, wherein the storage section stores adjustment item information on an adjustment item for a component of the image forming apparatus, the adjustment item indicating an adjustment which is necessary when the component is replaced, and
wherein when the image quality adjustment is included in the adjustment item information for the replaced component, the control section selects the test image reading section from among the image reading sections based on the connection information, performs control for the selected test image reading section to read the test image formed by the image forming section, and performs the image quality adjustment based on the read test image.

7. An image quality adjustment method of an image forming apparatus connectable with a plurality of image reading sections each of which is operable to read an image formed on paper, the method comprising:
selecting a test image reading section from among the image reading sections based on connection information on a connection state between each of the image reading sections and the image forming apparatus;
reading a test image formed on the paper with the selected test image reading section; and
performing image quality adjustment based on the read test image.

* * * * *